(12) United States Patent
Saylor et al.

(10) Patent No.: US 8,547,635 B2
(45) Date of Patent: Oct. 1, 2013

(54) LENSES FOR 3D EYEWEAR

(75) Inventors: Ryan Saylor, Mission Viejo, CA (US); Carlos Reyes, Rancho Santa Margarita, CA (US)

(73) Assignee: Oakley, Inc., Foothill Ranch, CA (US)

(*) Notice: Subject to any disclaimer, the term of this patent is extended or adjusted under 35 U.S.C. 154(b) by 186 days.

(21) Appl. No.: 13/011,713

(22) Filed: Jan. 21, 2011

(65) Prior Publication Data
US 2011/0205626 A1   Aug. 25, 2011

Related U.S. Application Data

(60) Provisional application No. 61/297,597, filed on Jan. 22, 2010.

(51) Int. Cl.
*G02B 27/22* (2006.01)

(52) U.S. Cl.
USPC ......................................................... 359/464

(58) Field of Classification Search
USPC ........... 359/464; 351/159.27, 159.56, 159.75
See application file for complete search history.

(56) References Cited

U.S. PATENT DOCUMENTS

| | | | |
|---|---|---|---|
| 2,099,694 A | 11/1937 | Land | |
| 2,431,942 A | 12/1947 | Land | |
| 3,221,599 A | 12/1965 | Land | |
| 3,233,250 A | 2/1966 | Jonassen | |
| 3,531,189 A | 9/1970 | Petito | |
| 3,940,304 A | 2/1976 | Schuler | |
| 3,975,474 A | 8/1976 | Leblanc | |
| 4,431,265 A | 2/1984 | Benton | |
| 4,537,612 A | 8/1985 | Borrelli et al. | |
| 4,564,408 A | 1/1986 | Crumbach et al. | |
| 4,608,105 A | 8/1986 | Alger | |
| 4,648,925 A | 3/1987 | Goepfert et al. | |
| 4,719,507 A | 1/1988 | Bos | |
| 4,792,850 A | 12/1988 | Liptoh et al. | |

(Continued)

FOREIGN PATENT DOCUMENTS

| | | |
|---|---|---|
| CN | 1912688 | 2/2007 |
| CN | 101151306 | 3/2008 |

(Continued)

OTHER PUBLICATIONS

International Search Report and Written Opinion issued Mar. 17, 2011 to PCT Application PCT/US2011/022142.

(Continued)

*Primary Examiner* — Hung Dang
(74) *Attorney, Agent, or Firm* — Knobbe Martens Olson & Bears, LLP

(57) ABSTRACT

Eyewear for viewing three-dimensional (3D) images is disclosed. In some embodiments, the eyewear can include lenses that include circularly polarizing filters. The right lens can block light that is circularly polarized in a first direction, and the left lens can block light that is circularly polarized in a second, opposite direction. The circularly polarizing filters can be attached to a surface (e.g., the front surface) of a lens body using an adhesive or by lamination. The lenses can have one or more surfaces that conform to the surface of a sphere, a cylinder, or another geometric shape. In some embodiments, the surface of the lens to which the circularly polarizing filter is applied is cylindrical. In some embodiments, the lenses can have a tapered thickness to provide for optical correction of the lenses.

16 Claims, 24 Drawing Sheets

(56) References Cited

U.S. PATENT DOCUMENTS

| | | |
|---|---|---|
| 4,793,703 A | 12/1988 | Fretz, Jr. |
| 4,859,048 A | 8/1989 | Jannard |
| 4,865,668 A | 9/1989 | Goepfert et al. |
| 4,871,233 A | 10/1989 | Sheiman |
| 4,877,307 A | 10/1989 | Kalmanash |
| 4,925,270 A | 5/1990 | Eckmann |
| 5,144,344 A | 9/1992 | Takahashi et al. |
| 5,162,825 A | 11/1992 | Kamekura et al. |
| 5,266,977 A | 11/1993 | Linden |
| 5,286,419 A | 2/1994 | van Ligten et al. |
| 5,319,478 A | 6/1994 | Funfschilling et al. |
| 5,321,443 A | 6/1994 | Huber et al. |
| 5,327,180 A | 7/1994 | Hester, III et al. |
| 5,351,100 A | 9/1994 | Schwenzfeier et al. |
| 5,434,707 A | 7/1995 | Dalzell et al. |
| 5,458,820 A | 10/1995 | Lefebvre |
| 5,478,824 A | 12/1995 | Burns et al. |
| 5,559,632 A | 9/1996 | Lawrence et al. |
| 5,564,810 A | 10/1996 | Larson |
| 5,598,231 A | 1/1997 | Lin |
| 5,658,502 A | 8/1997 | Hughes |
| 5,663,779 A | 9/1997 | Karasawa |
| 5,694,240 A | 12/1997 | Sternbergh |
| 5,702,813 A | 12/1997 | Murata et al. |
| 5,751,481 A | 5/1998 | Dalzell et al. |
| 5,805,336 A | 9/1998 | Dalzell et al. |
| RE36,049 E | 1/1999 | Kamekura et al. |
| 5,880,798 A | 3/1999 | Walton et al. |
| 5,886,771 A | 3/1999 | Osgood |
| 5,997,139 A | 12/1999 | Yasuda |
| 6,002,518 A | 12/1999 | Faris |
| 6,003,990 A | 12/1999 | Einhorn |
| 6,010,218 A | 1/2000 | Houston et al. |
| 6,115,177 A | 9/2000 | Vossler |
| 6,162,376 A | 12/2000 | Mead |
| 6,177,032 B1 | 1/2001 | Smith et al. |
| 6,220,703 B1 | 4/2001 | Evans et al. |
| 6,239,778 B1 | 5/2001 | Palffy-Muhoray et al. |
| 6,248,431 B1 | 6/2001 | Jiang et al. |
| 6,256,152 B1 | 7/2001 | Coldrey et al. |
| 6,262,376 B1 | 7/2001 | Hurwitz et al. |
| 6,312,811 B1 | 11/2001 | Frigoli et al. |
| 6,338,558 B1 | 1/2002 | Kita |
| 6,355,124 B1 | 3/2002 | Blomberg et al. |
| 6,367,930 B1 | 4/2002 | Santelices et al. |
| 6,391,433 B2 | 5/2002 | Jiang et al. |
| 6,403,223 B1 | 6/2002 | Albro et al. |
| 6,413,641 B1 | 7/2002 | Yamasaki et al. |
| 6,562,466 B2 | 5/2003 | Jiang et al. |
| 6,585,373 B2 | 7/2003 | Evans et al. |
| 6,638,583 B1 | 10/2003 | Sharp et al. |
| 6,650,473 B2 | 11/2003 | Nakagoshi |
| 6,659,608 B2 | 12/2003 | Yamamoto et al. |
| 6,730,459 B2 | 5/2004 | Nishikawa et al. |
| 6,746,631 B2 | 6/2004 | Gettens |
| 6,761,784 B1 | 7/2004 | Hage |
| 6,786,599 B2 | 9/2004 | Hayashi |
| 6,797,383 B2 | 9/2004 | Nishizawa et al. |
| 6,801,360 B2 | 10/2004 | Phillips et al. |
| 6,807,006 B2 | 10/2004 | Nakagoshi |
| 6,834,956 B2 | 12/2004 | Phillips |
| 6,858,305 B2 | 2/2005 | Degand et al. |
| 6,951,681 B2 | 10/2005 | Hartley et al. |
| 6,962,424 B2 | 11/2005 | O'Connor et al. |
| 6,972,136 B2 | 12/2005 | Koenig et al. |
| 7,025,458 B2 | 4/2006 | Vu |
| 7,036,932 B2 | 5/2006 | Boulineau et al. |
| 7,044,599 B2 | 5/2006 | Kumar et al. |
| 7,044,600 B2 | 5/2006 | Kumar et al. |
| 7,077,985 B2 | 7/2006 | Maki et al. |
| 7,088,511 B2 | 8/2006 | Trapani et al. |
| 7,097,303 B2 | 8/2006 | Kumar et al. |
| 7,097,304 B2 | 8/2006 | Kumar et al. |
| 7,101,043 B2 | 9/2006 | Kumar et al. |
| 7,106,509 B2 | 9/2006 | Sharp |
| 7,126,754 B2 | 10/2006 | Yamaoka et al. |
| 7,128,414 B2 | 10/2006 | Muisener et al. |
| 7,128,415 B2 | 10/2006 | Chou |
| 7,164,529 B2 | 1/2007 | Sekizawa et al. |
| 7,165,842 B2 | 1/2007 | Cobb et al. |
| 7,175,878 B2 | 2/2007 | Helmstetter et al. |
| 7,180,554 B2 | 2/2007 | Divelbiss et al. |
| 7,182,976 B2 | 2/2007 | Takahashi et al. |
| 7,242,524 B2 | 7/2007 | Dike |
| 7,286,287 B1 | 10/2007 | Ofner |
| 7,289,257 B1 | 10/2007 | Nakagoshi |
| 7,311,399 B2 | 12/2007 | Phillips |
| 7,320,515 B2 | 1/2008 | Lin |
| 7,354,150 B2 | 4/2008 | Sugimura et al. |
| 7,357,503 B2 | 4/2008 | Mosse et al. |
| 7,422,329 B2 | 9/2008 | Berman |
| 7,441,893 B2 | 10/2008 | Momoda et al. |
| 7,455,796 B2 | 11/2008 | Jiang et al. |
| 7,504,054 B2 | 3/2009 | Pyles et al. |
| 7,506,976 B2 | 3/2009 | Baiocchi et al. |
| 7,510,280 B2 | 3/2009 | Sharp |
| 7,517,081 B2 | 4/2009 | Lipton et al. |
| 7,520,608 B2 | 4/2009 | Ishak et al. |
| 7,524,053 B2 | 4/2009 | Lipton |
| 7,581,832 B2 | 9/2009 | Begon et al. |
| 7,594,280 B2 | 9/2009 | Lindahl |
| 7,632,432 B2 | 12/2009 | Adileh et al. |
| 7,662,318 B2 | 2/2010 | Jiang et al. |
| 7,727,352 B2 | 6/2010 | Lesartre et al. |
| 7,784,938 B2 | 8/2010 | Richards et al. |
| 7,854,506 B1 | 12/2010 | Johnson et al. |
| 7,935,212 B2 | 5/2011 | Jiang et al. |
| 7,938,536 B2 | 5/2011 | Cano et al. |
| 7,946,703 B2 | 5/2011 | Johnson et al. |
| 7,950,798 B2 | 5/2011 | Johnson et al. |
| 8,044,879 B2 | 10/2011 | Matveev et al. |
| 8,072,552 B2 | 12/2011 | Robinson |
| 8,202,392 B2 | 6/2012 | Jiang et al. |
| 2001/0028435 A1 | 10/2001 | Evans et al. |
| 2001/0028436 A1 | 10/2001 | Evans et al. |
| 2003/0184863 A1 | 10/2003 | Nakagoshi |
| 2004/0156105 A1 | 8/2004 | Trapani et al. |
| 2004/0223221 A1 | 11/2004 | Sugimura et al. |
| 2005/0110944 A1 | 5/2005 | Pfund |
| 2005/0269721 A1 | 12/2005 | Adileh et al. |
| 2005/0275943 A1 | 12/2005 | Sugimura et al. |
| 2006/0050225 A1 | 3/2006 | Parnell |
| 2006/0196413 A1 | 9/2006 | Sugimura |
| 2006/0219347 A1 | 10/2006 | Begon et al. |
| 2006/0251884 A1 | 11/2006 | Naito et al. |
| 2006/0274256 A1 | 12/2006 | Parnell |
| 2006/0285033 A1 | 12/2006 | Sharp |
| 2007/0126983 A1 | 6/2007 | Godeau et al. |
| 2007/0188698 A1 | 8/2007 | Mosse et al. |
| 2007/0188711 A1 | 8/2007 | Sharp et al. |
| 2007/0195262 A1 | 8/2007 | Mosse et al. |
| 2007/0236809 A1 | 10/2007 | Lippey et al. |
| 2008/0023138 A1 | 1/2008 | Zheng |
| 2008/0055540 A1 | 3/2008 | Mosse et al. |
| 2008/0062259 A1 | 3/2008 | Lipton et al. |
| 2008/0074613 A1 | 3/2008 | Phillips |
| 2008/0151182 A1 | 6/2008 | Hsu |
| 2009/0079934 A1 | 3/2009 | Su et al. |
| 2009/0092751 A1 | 4/2009 | Jiang et al. |
| 2009/0097117 A1 | 4/2009 | Coleman |
| 2010/0006219 A1 | 1/2010 | Baranton et al. |
| 2010/0033675 A1 | 2/2010 | Miyoshi |
| 2010/0039352 A1 | 2/2010 | Lippey et al. |
| 2010/0103516 A1 | 4/2010 | McKnight et al. |
| 2010/0110567 A1 | 5/2010 | Glacet et al. |
| 2011/0188115 A1 | 8/2011 | Sharp et al. |
| 2011/0199680 A1 | 8/2011 | Saylor et al. |
| 2012/0050858 A1 | 3/2012 | Johnson et al. |
| 2012/0086907 A1* | 4/2012 | Coleman et al. ......... 351/159.56 |

FOREIGN PATENT DOCUMENTS

| | | |
|---|---|---|
| CN | 101271198 | 9/2008 |
| EP | 0 299 509 | 1/1989 |
| EP | 0 505 998 | 9/1992 |

| | | |
|---|---|---|
| JP | 6-255053 | 9/1994 |
| JP | 2005-134722 | 5/2005 |
| KR | 2002-0088052 | 11/2002 |
| KR | 10-0720732 | 5/2007 |
| WO | WO 99/52480 | 10/1999 |

OTHER PUBLICATIONS

International Preliminary Report on Patentability issued Jul. 24, 2012 for PCT Application PCT/US2011/022142.
International Search Report and Written Opinion issued Mar. 14, 2011 to PCT Application PCT/US2011/022114.
International Preliminary Report on Patentability issued Jul. 24, 2012 for PCT Application PCT/US2011/022114.
Polaroid Eyewear and RealD Sign Global License Agreement for Polaroid Premium 3D Eyewear, dated Jul. 29, 2010.
Arton Film Press Release, JSR Corporation, dated Mar. 2, 2003.
3D CineCast Blog Post, dated Oct. 12, 2007, downloaded from http://3dcinecast.blogspot.com/2007_10_01_archive.html.
Polarized 3D Glasses, Rainbow Symphony Website, dated Jan. 6, 2007.
Circular Polarized—Aviation Style, The 3D Market Website, dated Jan. 1, 2007.
3DStereo.com Website, dated Apr. 27, 2007.
3D Glasses, Berezin Website, dated Jan. 6, 2007.

* cited by examiner

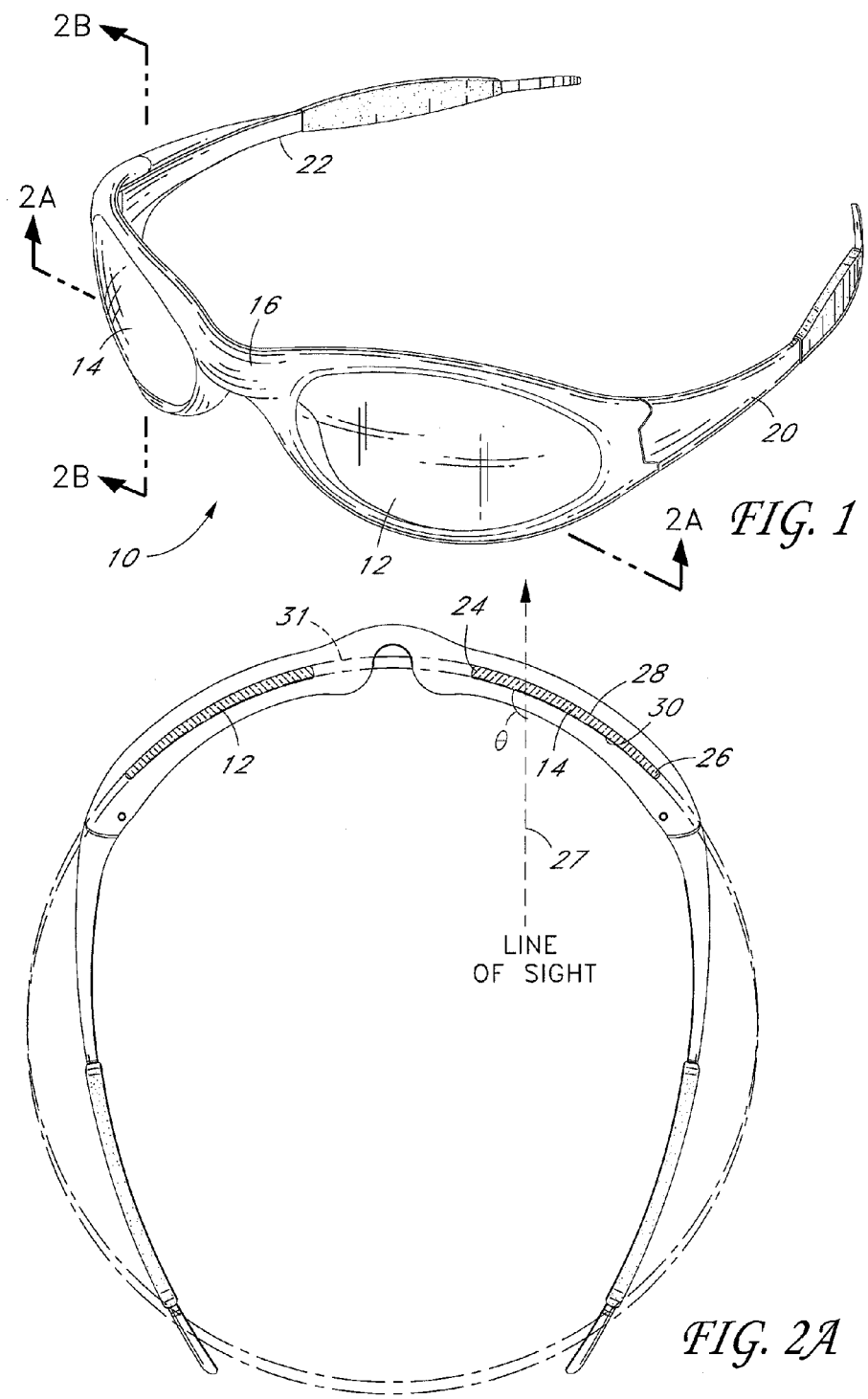

LENSES FOR 3D EYEWEAR

CROSS REFERENCE TO RELATED APPLICATIONS

This application claims the benefit under 35 U.S.C. §119(e) of U.S. Provisional Patent Application No. 61/297,597, entitled OPTICALLY CORRECTED 3D LENS FOR EYEGLASSES, filed Jan. 22, 2010, the entirety of which is hereby incorporated by reference and made a part of this specification.

FIELD OF THE DISCLOSURE

The present invention relates generally to 3D lenses used in eyewear, and more particularly to curved 3D lenses that include filters configured to block circular polarized light.

BACKGROUND

Eyewear with specialized lenses can be used in conjunction with specialized two-dimensional images to present the wearer with a three-dimensional (3D) image. Current 3D eyewear is generally made from cheap materials. Conventional 3D eyewear frames are often made of paper or thin plastic, and conventional 3D lenses are generally planar. In addition to being relatively inexpensive, planar lenses have the advantage that the line of sight of the wearer, when looking straight ahead, generally crosses the posterior surface of the lens normal to the lens surface, yielding little distortion.

However, planar lenses have several disadvantages. Eyeglasses using planar lenses leave a significant portion of the wearer's peripheral vision uncovered, allowing peripheral light to directly reach the wearer's eyes. 3D eyeglasses having planar lenses do not conform well to the shape of the wearer's head and thus often cause discomfort even when worn for short periods of time (e.g., during a movie). Planar lenses are also undesirable for aesthetic style reasons.

Thus, there exists a need for curved lenses for use in 3D eyewear that minimize optical distortions.

SUMMARY OF CERTAIN EMBODIMENTS

By way of example and not limitation, a method of forming a lens blank for 3D eyewear is disclosed. The method can include providing a lens blank body that has a surface that is curved along a substantially horizontal axis and substantially linear along a substantially vertical axis; applying a hardcoat to the lens blank body; thermally curing the hardcoat; applying a corona treatment to the surface of the lens blank body; and providing a circular polarizer film comprising a quarter-wave plate and a linear polarizer. The linear polarizer can include a transmission axis. The method can further include laminating the circular polarizer film onto the surface of the lens blank body so that the transmission axis is aligned substantially parallel to the substantially vertical axis of the lens blank body such that the polarization efficiency of the linear polarizer is not substantially degraded by the curvature of the lens blank body. The lens blank body can be formed by injection molding.

The method can further include placing the lens blank body with the circular polarizer film laminated thereon into a pressure pot, and applying pressure from the pressure pot to the lens blank body and circular polarizer film.

The method can further include cutting the lens blank body and the circular polarizer film laminated thereon to form a first lens and a second lens. The first and second lenses can both be configured to be used as right lenses, and the orientation of the second lens can be offset by about 180° from the orientation of the first lens as the first and second lenses are cut. The lens blank body can have a non-uniform thickness and an axis of symmetry substantially parallel with the substantially vertical axis. A centerpoint of the first lens can be positioned on a first side of the axis of symmetry and a centerpoint of the second lens can be positioned on a second side of the axis of symmetry, and the centerpoints of the first and second lenses can be substantially equidistant from the axis of symmetry such that the first and second lenses have tapering thicknesses that are substantially the same.

The lens blank body can include a front surface and a back surface, and the circular polarizer film can be laminated onto the front surface of the lens blank body. The method can further include cutting the lens blank body and the circular polarizer film to form a lens, and mounting the lens onto an eyewear frame. The circular polarizer film can be the most forward layer of the lens, such that during 3D viewing, light of an image strikes the circular polarizer film before any other layer of the lens.

The lens blank body can include a front surface and a back surface, and the front surface can conform to the surface of a front cylinder having a first center, and the back surface can conform to the surface of a back cylinder having a second center. The second center can be offset from the first center such that the thickness of the lens blank body is tapered along the substantially horizontal axis. The method can further include cutting at least one lens from the lens blank body. A line drawn between the first center and the second center can provide an optical centerline for the lens. The method can further include mounting the lens in an eyewear frame such that the lens is positioned so that the line of sight of the wearer is substantially parallel to the optical centerline, and so that the line of sight of the wearer is offset from the optical centerline.

A lens for use with 3D eyewear is disclosed. The lens can include a lens body having a surface that is curved along a first axis and substantially linear along a second axis, and a circular polarizer attached to the surface of the lens body. The circular polarizer can include a quarter-wave plate and a linear polarizer. The linear polarizer can have a transmission axis, and the transmission axis can be aligned substantially parallel to the second axis of the lens body.

A method of forming a lens is disclosed. The method can include providing a lens body that is curved along a first axis and substantially linear along a second axis, providing a circular polarizer film having a quarter-wave plate and a linear polarizer, and laminating the circular polarizer film onto the surface of the lens blank body. The linear polarizer can include a transmission axis that is aligned substantially parallel to the second axis of the lens blank body such that the linear polarizer is substantially not curved along its transmission axis.

BRIEF DESCRIPTION OF THE DRAWINGS

FIG. 1 is a perspective view of 3D eyewear incorporating taper corrected lenses.

FIG. 2A is a cross-sectional view of the 3D eyewear of FIG. 1 taken along the lines 2A-2A.

FIG. 10A illustrates the profile of a lens configured and oriented to have downward rake.

FIG. 10B illustrates the profile of a vertically centrally oriented lens with no rake.

FIG. 10C illustrates a lens exhibiting downward rake but which is not configured and oriented to minimize prismatic distortion for the straight ahead line of sight.

DETAILED DESCRIPTION

Although some embodiments will be discussed below in terms of lenses having "cylindrical" or "spherical" front and rear surfaces (surfaces which conform substantially to a portion of the surface of a sphere or cylinder, respectively), it will be understood by those having ordinary skill in the art that, in some embodiments, lenses having different surface geometries can be used. Additionally, it will be understood that lenses of many front elevational shapes and orientations in the as-worn position can be used, beyond those illustrated herein. In particular, either the front or rear surface of either lens may conform to the surface of a toroidal or other aspheric geometry.

Figure 2B:
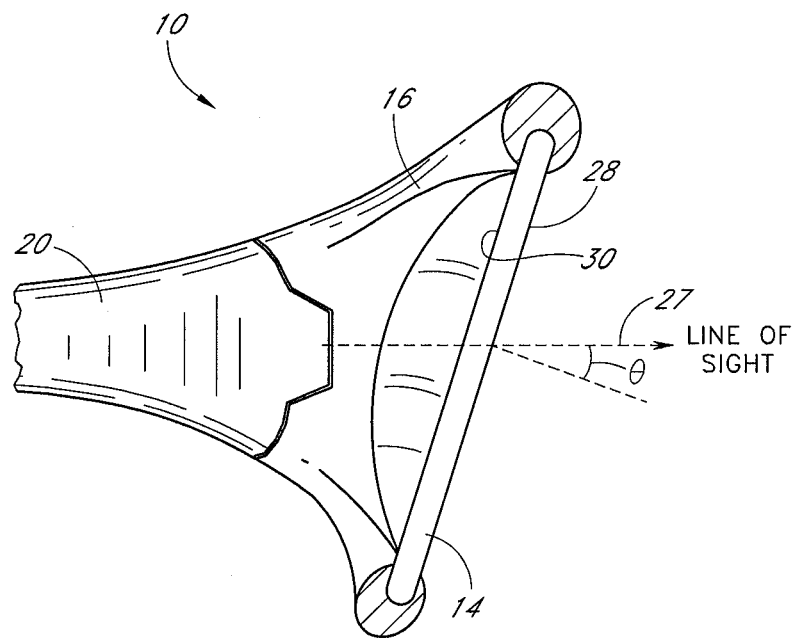
FIG. 2B is a cross-sectional view of a cylindrical lens implementation of the 3D eyewear of FIG. 1 taken along the line 2B-2B.

Referring to FIGS. 1 and 2A-B, there is illustrated 3D eyewear 10 having first and second curved lenses 12, 14. FIG. 1 is a perspective view of the 3D eyewear 10. FIG. 2A is a cross-sectional view of the 3D eyewear 10 taken at a horizontal plane through the line 2A-2A. FIG. 2B is a cross-sectional view of the 3D eyewear 10 taken at a vertical plane through the line 2B-2B. The embodiment shown in FIGS. 1 and 2A-B illustrates 3D lenses 12, 14 incorporated into one example eyeglass design, and lenses and frames of many other shapes and configurations may be used, as will become apparent based upon the disclosure herein. The mounting frame 16 having continuous orbitals is not an essential feature. The orbitals may bound only the bottom edge(s) of the lenses 12, 14, only the top edges, or the entire lenses as illustrated. Alternatively, the frame 16 can bound any other portions of the lenses as will be evident to those of skill in the art. Frameless eyeglasses can also be used.

A pair of earstems 20, 22 pivotally attach to the frame 16. Alternatively, the earstems 20, 22 may attach directly to the lenses 12, 14. The frame may comprise any of a variety of metals, composites or relatively rigid, molded thermoplastic materials which are well known in the art, and may be transparent or any of a variety of colors. Injection molding, machining and other construction techniques are well known in the art.

In the embodiment shown in FIGS. 1 and 2, the lenses 12, 14 are cylindrical in shape. As can be seen in FIG. 2A, the lenses 12, 14 are curved along a horizontal axis. The lenses 12, 14 can have a tapering thickness along the horizontal axis and can be decentered for optical correction as described herein. As can be seen in FIG. 2B, the lenses 12, 14 can be substantially linear (not curved) along a vertical axis.

Lenses 12, 14 are configured to present a three-dimensional image to the wearer when viewing a specialized two-dimensional image (or series of images). A three-dimensional image can be produced through the use of circularly polarized light. Lenses 12, 14 can include circular polarizers configured to block circularly polarized light that is polarized at opposite orientations. For example, in one embodiment right lens 14 can include a circular polarizer that is configured to allow light that is right-hand circularly polarized to pass through the right lens 14, while left lens 12 can include a circular polarizer that is configured to allow light that is left-hand circularly polarized to pass through the left lens 12. Right-eye images are produced with right-hand polarized light, and left-eye images are produced with left-hand polarized light. A three-dimensional image can be produced by superimposing right-eye and left-eye images or displaying them rapidly in sequence.

A circular polarizer can be made by combining a linear polarizer with a quarter-wave plate having its fast axis offset from the transmission axis of the linear polarizer by about 45°. An offset of about 45° in one direction yields a right-hand circular polarizer and an offset of about 45° in the other direction yields a left-hand circular polarizer. It should be understood that the term circular polarizer is intended to include polarizers that filter somewhat elliptically polarized light as well as polarizers that filter completely circularly polarized light. For example, the term quarter-wave plate as used herein is intended to include wave plates that produce a quarter-wavelength phase shift or a phase shift that is close enough to a quarter-wavelength phase shift to be effective for 3D viewing. Also, a circular polarizer can be formed by combining a linear polarizer with a quarter-wave plate having its fast axis offset from the transmission axis of the linear polarizer by an angle of between about 30° and about 60°, or more preferably between about 40° and about 50°, or most preferably by about 45°.

Although circular polarizing lenses are more expensive and complicated than linear polarizing lenses, the use of circular polarization provides several advantages over linear polarization. First, when viewing three-dimensional images using linearly polarized lenses, image integrity can be compromised when the wearer tilts his head because the angles of polarization of the lenses is offset from their intended orientation. In contrast, when using circularly polarized lenses, the user can tilt his head without causing distortion because tilting a circular polarizer does not affect its polarization. For example, a clockwise (right-hand) circular polarizer remains clockwise oriented when it is turned. Second, when wearing eyewear having lenses that are linearly polarized at different angles, the wearer can experience non-uniform glare as between the right and left eyes. The non-uniform glare can be disorienting and can cause headaches. Circularly polarized lenses produce less of the non-uniform glare problem identified above. The wearer would experience non-uniform glare when viewing circularly polarized glare, but circularly polarized glare is rare.

In some embodiments, the lenses 12, 14 are configured to provide variable light attenuation in addition to the polarization or other 3D functional layer. For example, the lenses 12, 14 can comprise photochromic compositions that darken in bright light and fade in lower light environments. Such compositions can include, for example, but without limitation, silver, copper, and cadmium halides. Photochromic compounds for lenses are disclosed in U.S. Pat. Nos. 6,312,811, 5,658,502, 4,537,612, each of which are hereby expressly incorporated in its entirety herein by reference. Photochromic lenses would thus provide relatively little light attenuation when viewing three-dimensional images in a lower light environment, such as in a movie theater, but would automatically provide increased light attenuation when used in bright light, such as when worn outdoors. Thus, in some embodiments, the eyewear 10 can be used both for 3D viewing and for normal outdoor use.

In other embodiments, lenses 12, 14 can additionally comprise a dichroic dye guest-host device configured to provide variable light attenuation. For example, lenses 12, 14 can comprise spaced substrates coated with a conducting layer, an alignment layer, and preferably a passivation layer. Disposed between the substrates is a guest-host solution which comprises a host material and a light-absorbing dichroic dye guest. A power circuit can be supported by the frame 16. The power circuit is provided with a power supply connected to the conducting layers. Adjustment of the power supply alters the orientation of the host material which in turn alters the orientation of the dichroic dye. Light is absorbed by the dichroic dye, depending upon its orientation, and thus provides variable light attenuation, that can be manually adjusted by the wearer. Such a dichroic dye guest-host device is disclosed in U.S. Pat. No. 6,239,778, which is hereby expressly incorporated in its entirety herein by reference.

In some embodiments, the lenses 12, 14 can be configured to provide color tuning to modify the color of light presented to the eyes of the wearer. For example, the lenses 12, 14 can include a trichroic element or other transmission profile modifier to enhance or suppress the transmission characteristics of light at different wavelengths, to affect the perception of the wearer. The eyewear 10 may be used for 3D viewing (e.g., during a 3D movie in a theater) rather than for protection from sunlight. Thus, in some embodiments, the lenses 12, 14 do not contain transmission profile modifiers, light attenuating dyes, UV blocking additives, or photochromic features, so as to provide the wearer with a bright, unaltered view of the 3D images.

Lenses 12, 14 for 3D eyewear 10 can be manufactured by a variety of processes. For example, a circular polarizer (e.g., a film) can be applied (e.g., bonded, laminated, coated) onto an injection molded lens blank body, and one of the lenses 12, 14 can be cut from the resulting lens blank. In some embodiments, right lenses are cut from separate lens blanks from left lenses because the right and left lenses include differently oriented circular polarizers. Since, in some embodiments, the shape of the right and left lenses can be mirror images of each other, only the right lens will generally be described for most of the discussion below. In describing a method of cutting lenses from preformed lens blanks, however, the manner in which a left lens differs from the right lens will be related to the degree of rake and wrap chosen for the as-worn lens orientation. Alternatively, the lens body can be molded directly into its final shape and size, to eliminate the need for post molding cutting steps, and the circular polarizer can be applied to the shaped lens body. In either event, the lens may be subjected to post-molding processes that modify the geometry of the lens depending upon the desired result. For example, the rear surface of the lens can be ground or polished to affect the power, prism, cylinder, or other optical properties of the lens. In some embodiments, the lenses 12, 14 can have optical power and can be prescription lenses configured to correct for near-sighted or far-sighted vision. The lenses 12, 14 can have cylindrical characteristics to correct for astigmatism.

Referring to FIG. 2A, lens 14 is characterized in a horizontal plane by a generally arcuate shape, extending from a medial edge 24 throughout at least a portion and of the wearer's range of vision to a lateral edge 26. The arc length of the lens from the medial edge 24 to the lateral edge 26 in a dual lens system will generally be within the range of from about 1½ inches to about 3½ inches, and can be within the range of from about 2 inches to about 3 inches. In some embodiments, the arc length of the lens is about 2⅜ inches.

Although the outer surfaces of the lenses 12, 14 appear to be illustrated as lying on a common circle 31, the right and left lenses in a high wrap eyeglass will generally be canted such that the medial edge of each lens will fall outside of the circle 31 and the lateral edges will fall inside of the circle 31. Such canting of the lens increases the angle θ (FIG. 2) and increases the desirability of the optical correction described herein.

When worn, the lens 14 should at least extend across the wearer's normal straight ahead line of sight 27, and can extend substantially across the wearer's peripheral zones of vision. As used herein, the wearer's normal line of sight shall refer to a line projecting straight ahead of the wearer's eye, with substantially no angular deviation in either the vertical or horizontal planes as illustrated for example by line 130 in FIGS. 9 and 10A-C.

The lens 14 is provided with an anterior surface 28, a posterior surface 30, and a thickness therebetween, which can be variable along the horizontal direction. The thickness of the lens 14 in the region of the medial edge 24 for a polycarbonate lens body is generally within the range of from about 1 mm to about 2.0 mm, and can be in the range of from about 1.25 mm to about 1.75 mm. In some embodiments, the thickest portion of the lens 14 is at or about the intersection of the lens with the optical centerline, and is about 1.4 mm. In some embodiments, a circular polarizer film applied to the lens body may increase the thickness of the lens 14 by a substantially uniform amount of at least about 1.0 mm and/or no more than about 2.0 mm, and in some cases, by about 1.5 mm.

In some embodiments, the thickness of the lens 14 tapers smoothly, though not necessarily linearly, from the maximum thickness proximate the medial edge 24 to a relatively lesser thickness at the lateral edge 26. The thickness of the lens near the lateral edge 26 is generally within the range of from about 0.635 mm to about 1.52 mm, and can be within the range of from about 0.762 mm to about 1.27 mm. In some polycarbonate embodiments, the lens has a minimum thickness in the lateral zone of about 1.15 mm. The minimum thickness at lateral edge 26 is generally governed by the desired impact resistance of the lens. Medial edge thicknesses within the range of from about 0.050 inches to about 0.085 inches and lateral edge thicknesses within the range of from about 0.035 inches to about 0.060 inches are often satisfactory.

Turning now to FIG. 2B, the lens 14 can be linear (not curved) along a vertical plane (e.g., cylindrical or frusto conical lens geometry). In some embodiments, the lenses 12, 14 can be aligned substantially parallel with the vertical axis such that the line of sight 27 is substantially normal to the anterior surface 28 and the posterior surface 30 of the lens. In the embodiment illustrated in FIG. 2B, the lens 14 is angled downward such that a line normal to the lens is offset from the straight ahead normal line of sight 27 by an angle $\phi$. The angle $\phi$ of offset can be greater than about 0° and/or less than about 30°, or greater than about 10° and/or less than about 20°, or about 15°, although other angles $\phi$ outside of these ranges may also be used. For certain polarized 3D lenses, the rake angle $\phi$ is less than about 10°, preferably less than about 5°, more preferably less than about 2° and optimally about zero to optimize 3d performance. Various cylindrically shaped lenses may be used. The anterior surface 28 and/or the posterior surface 30 of the lens 14 can conform to the surface of a right circular cylinder such that the radius of curvature along the horizontal axis is substantially uniform. An elliptical cylinder can be used to provide lenses that have non-uniform curvature in the horizontal direction. For example, a lens may be more curved near its lateral edge 26 than its medial edge 24. In some embodiments, an oblique (non-right) cylinder can be used, for example, to provide a lens that is angled in the vertical direction (e.g., as shown in FIG. 2B).

Figure 3:
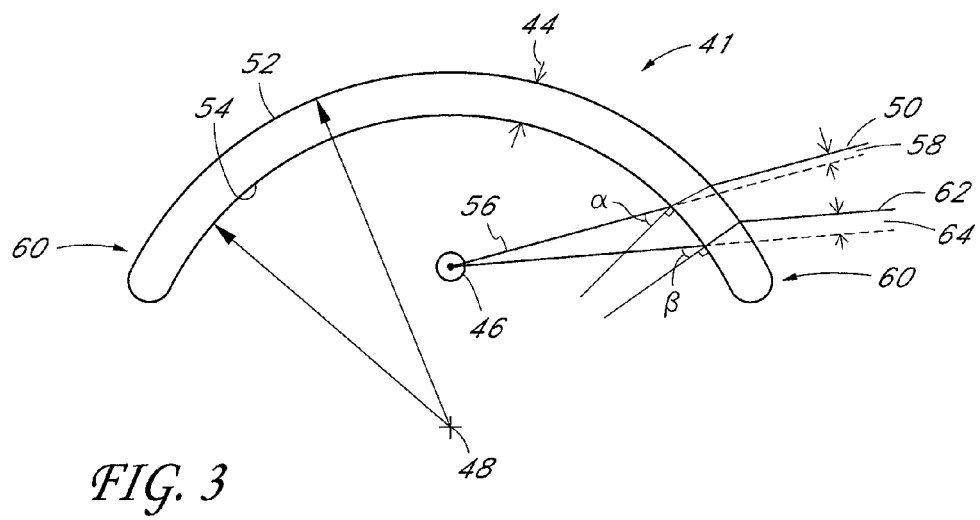
FIG. 3 is a schematic horizontal cross-sectional view of an untapered lens for a dual lens 3D eyewear system.

Although 3D eyewear having lenses that provide significant wrap provide lateral eye protection, the lens curvature introduces measureable prismatic distortion through the wearer's angular range of vision. FIG. 3 schematically illustrates refraction in a lens 41 with circular inside and outside surface horizontal cross-sections, having a uniform thickness 44. With such a lens 41, the angle of incidence of rays from the lens 41 to the eye 46 changes throughout the angular range of vision. For example, a ray which shall be referred to for descriptive purposes as a medial light ray 50 strikes the lens 41 at an angle $\alpha$ to the normal at the point of incidence. As is well known in this art, bending of light at transmitting surfaces depends in part upon the angle of incidence of light rays. The ray 50 is refracted or bent in opposite directions at each of an outer surface 52 and an inner surface 54 of the lens 41, resulting in a transmitted ray 56 parallel to the incident ray 50. The transmitted ray 50 is laterally displaced, relative to the path of the incident ray 50, by a distance 58. This displacement represents a first order source of (prismatic) optical distortion.

Furthermore, refractory displacement is even more pronounced at a lateral end 60 due to a greater angle of incidence $\beta$. A peripheral incident ray 62 experiences greater displacement 64 than the medial incident ray 50, in accordance with Snell's Law, as will be understood by those of ordinary skill in the optical arts. The discrepancy between the peripheral ray displacement 64 and the medial ray displacement 58 results in a second order of optical distortion. This second order of distortion may cause substantial warping of an image seen through relatively lateral portions of the lens 41.

Figure 4:
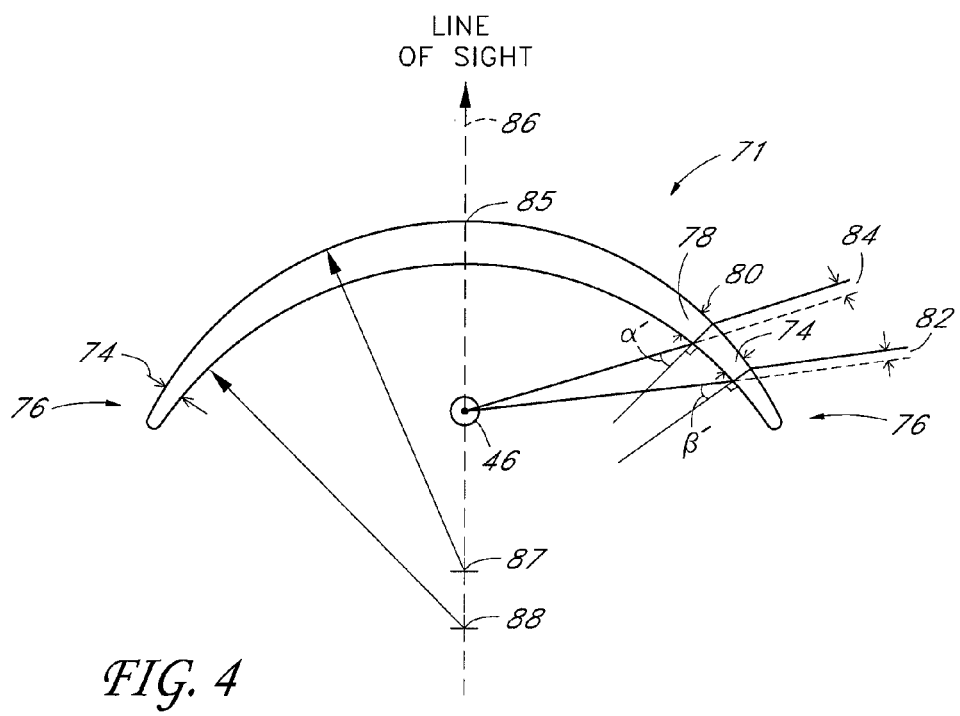
FIG. 4 is a schematic horizontal cross-sectional view of a tapered lens for a dual lens 3D eyewear system.

FIG. 4 schematically illustrates a lens 71 of tapered thickness, to compensate for the greater angle of incidence at the lateral ends 60 of the lens 41 (FIG. 3), similar in ways to that disclosed in the context of unitary lens systems in U.S. Pat. No. 4,859,048, issued to Jannard. Tapering produces a smaller lateral lens thickness 74 at a lateral end 76, relative to a lens thickness 78 at a more medial point 80. This smaller thickness 74 reduces an amount of peripheral ray displacement 82, relative to the peripheral ray displacement 64 through the untapered lens 41 of FIG. 4. In other words, lesser lens thickness 74 near the lateral end 76 of the tapered lens 71 compensates to some extent for a greater angle of incidence $\beta'$, relative to the thickness 78 and angle of incidence $\alpha'$ at the more medial point 80.

The resulting difference between peripheral ray displacement 82 and medial ray displacement 84 on the same lens 71 is not as great as the corresponding difference in FIG. 3, reducing the second order optical distortion. Note that the degree of correction of the second order distortion depends upon a relationship between the manner and degree of tapering from the apex 85 to each lateral end 76 and the manner in which the angle of incidence changes over the same range.

The lens 71 of FIG. 4 is illustrated as though it were mounted within a frame (not shown) such that the wearer's normal line of sight 86 passes perpendicularly through the lens 71 at the lens apex or mechanical center 85. In other words, the angle of incidence to the lens normal is zero for the wearer's normal line of sight. The outer and inner surfaces of lens 71 in the cross-sectional illustration conform to offset, equal-radius circles represented by centerpoints 87 and 88, respectively. A line drawn through centerpoints 87 and 88, referred to herein as the optical centerline of the lens, is collinear with the normal line of sight in the as-worn orientation. This conventional configuration shall be defined as a centrally oriented lens, for ease of description. Circumferentially clockwise or counterclockwise of the normal line of sight 86, the angle of incidence to the lens normal increases in a regular fashion from zero at the lens apex 85.

A degree of wrap may be desirable for aesthetic styling reasons, for lateral protection of the eyes from flying debris, or for interception of peripheral light. Wrap may be attained by utilizing lenses of tight horizontal curvature (high base), such as cylindrical or spherical lenses, and/or by mounting each lens in a position which is canted laterally and rearwardly relative to centrally oriented dual lenses. Such canting shifts the normal line of sight 86 out of a collinear relationship with the optical centerline, and changes the optics of the lens. As a result, dual lens eyewear with substantial "wrap" around the sides of a wearer's face has generally been accompanied by some degree of prismatic distortion.

Similarly, a high degree of rake or vertical tilting may be desirable for aesthetic reasons and for intercepting light, wind, dust or other debris from below the wearer's eyes. Just as wrap tends to shift the normal line of sight 86 out of a collinear relationship with a horizontal component of the optical centerline, mounting the lens with rake shifts the normal line of sight out of a collinear relationship with a vertical component of the optical centerline (e.g., as shown in FIG. 2B). Dual lens eyewear with substantial rake generally also display a degree of prismatic distortion.

Herein is provided an improved optical configuration and method for minimizing prismatic distortion in curved lenses for 3D eyewear having rake and/or wrap in the as-worn orientation. Although a wide variety of lens shapes and orientations can be used, the optical correction described herein has particular utility for dual lens 3D eyewear using high base curvature and demonstrating a high degree of wrap and/or rake in the as-worn orientation.

Figure 5:
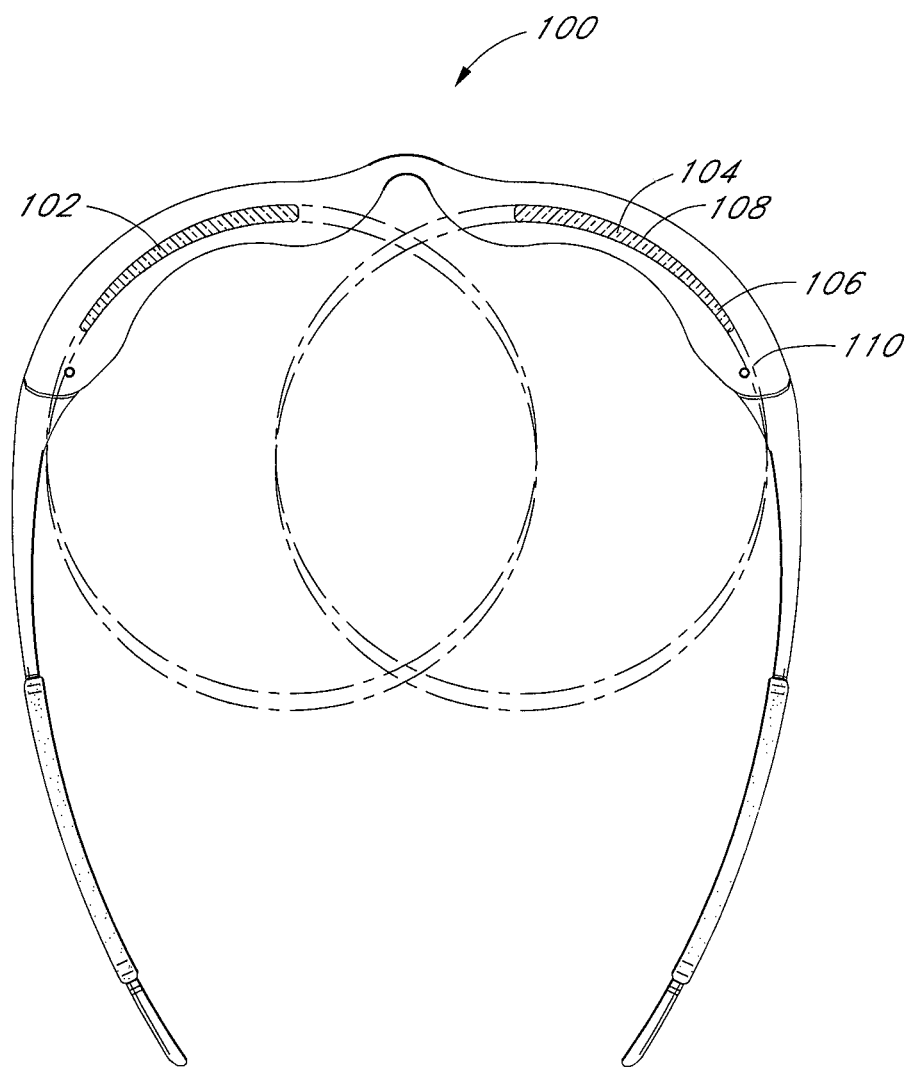
FIG. 5 is a cross-sectional view like that in FIG. 2, showing taper corrected cylindrical lenses having a greater base curvature.

Referring to FIGS. 2 and 5, the illustrated eyewear incorporates canted lenses 12 and 14 or 102 and 104, mounted in a position rotated laterally relative to conventional centrally oriented dual lens mountings. A canted lens may be conceived as having an orientation, relative to the wearer's head, which would be achieved by starting with conventional dual lens eyewear having centrally oriented lenses and bending the frame inwardly at the temples to wrap around the side of the head.

As a consequence of the increased wrap, the wearer's normal line of sight 27 no longer strikes the lens 14 perpendicularly, as illustrated in FIG. 4. Instead, the angle of incidence θ (FIG. 2) for the wearer's line of sight 27 is generally greater than 90°, and to achieve good wrap it may be greater than about 95°, and can be within the range of from about 100° to about 135°. In one 9.5 base embodiment the angle of incidence θ is about 101.75°. Lower base lenses generally will exhibit a larger angle θ in the as-worn orientation, and the angle θ in an embodiment having a base of 6.5 was about 113.4°. In a base 4 embodiment having a pupillary distance of 2.8 inches, the angle θ was about 119.864°.

FIG. 5 illustrates the horizontal cross-section of a 3D eyeglass 100 similar in style to that illustrated in FIG. 2, except having lenses 102 and 104 of tighter curvature (higher base) as well as possibly greater wrap. When the eyeglass 100 is worn, a lateral edge 106 of the lens 104 wraps significantly around and comes in close proximity to the wearer's temple to provide significant lateral eye coverage as has been discussed.

An anterior (front) surface 108 of the lens can generally conform to a portion of the surface of a regular geometric solid, such as a cylinder 110, shown here in horizontal cross-section. The horizontal curvature of the front surfaces of cylindrical lenses 102 and 104 of the illustrated embodiment can, therefore, be characterized by a radius. By convention in the industry, the curvature may also be expressed in terms of a base value, such that the radius (R) in millimeters of the anterior surface of the lens is equal to 530 divided by the base curve, or $$R = \frac{530}{B} \quad (1)$$

Some embodiments provide the ability to construct dual lens 3D eyeglass systems having relatively high wrap using lens blanks having a base curve of 6 or greater. Base curves between about 7½ and 10½ or between 8 and 9½ can be used, and, in some embodiments, a base curve between about 8¾ and 9 can be used. The radius of the circle conforming to the anterior surface of a base 6 lens, for example, is about 88.33 millimeters. For comparison, the radius of the circle which characterizes the anterior surface of a base 3 lens is about 176.66 millimeters. In some embodiments, a circular polarizer is applied to the lens such that the circular polarizer is curved to conform to the base curvature of the lens body. The curvature associated with a high base number can degrade the efficiency of the circular polarized and reduce the quality of the 3D image presented to the wearer. Thus, in some embodiments, a base curve of about 6½ or less is used (e.g., a base curve of 3, 4, 5, or 6) and generally no less than about 4.

The embodiment illustrated in FIG. 5 may be cut from a base 8¾ lens blank having a thickness of about 0.0649 inches at the optical centerline and about 0.053 inches at a reference point two inches along the outer circumference of the lens from the optical centerline. Alternatively, the lens can be molded directly into its final shape and configuration.

Figure 6:
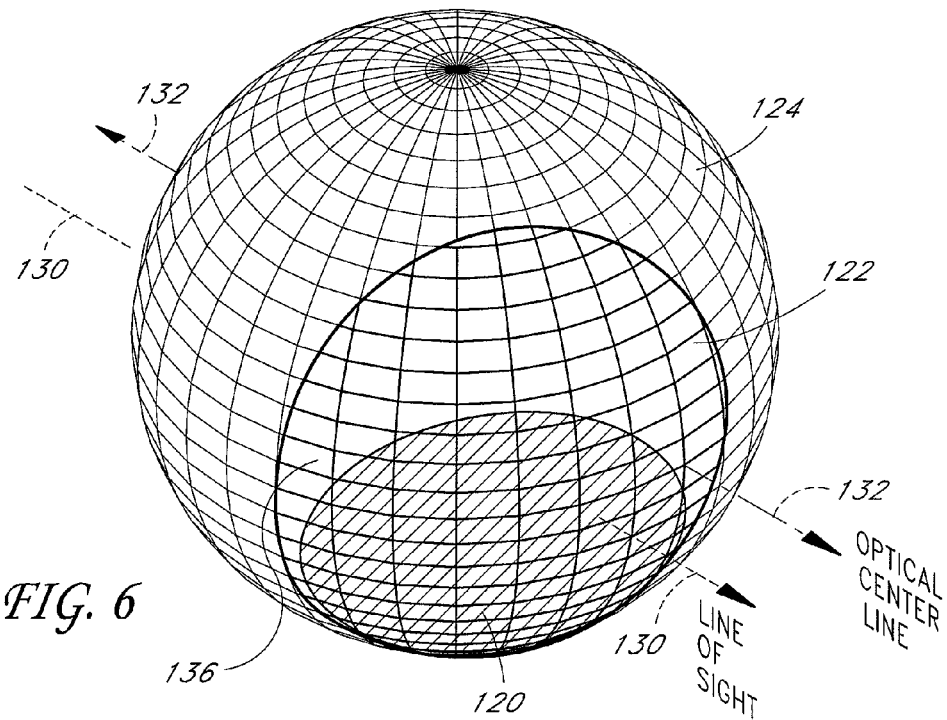
FIG. 6 is a perspective view of a lens blank conforming to a portion of the surface of a sphere, showing a lens profile to be cut from the blank.

FIG. 6 is a perspective view of a lens blank 122, a convex outside surface 136 of which generally conforms to a portion of the surface of a three-dimensional geometric shape 124 (e.g., a sphere in the illustrated embodiment). It will be understood by those of skill in this art that lenses can conform to any of a variety of geometric shapes (e.g., a cylinder or a toroid). In the embodiment shown in FIGS. 6-7, the lens 120 is curved in both the horizontal and vertical directions.

The outside surface of the lens can conform to a shape having a smooth, continuous surface having a constant horizontal radius (sphere or cylinder) or progressive curve (ellipse, toroid or ovoid) or other aspheric shape in either the horizontal or vertical planes. The geometric shape 124 of some embodiments herein described, however, generally approximates a sphere. The geometric shape 124 of other embodiments herein described is generally cylindrical, having curvature in one axis and no curvature in a second axis. Many features and aspects of the spherical lenses discussed in connection with FIGS. 6 and 7 can be similarly applied to cylindrical lenses, as well as to lenses that conform to other geometric shapes.

Figure 7A:
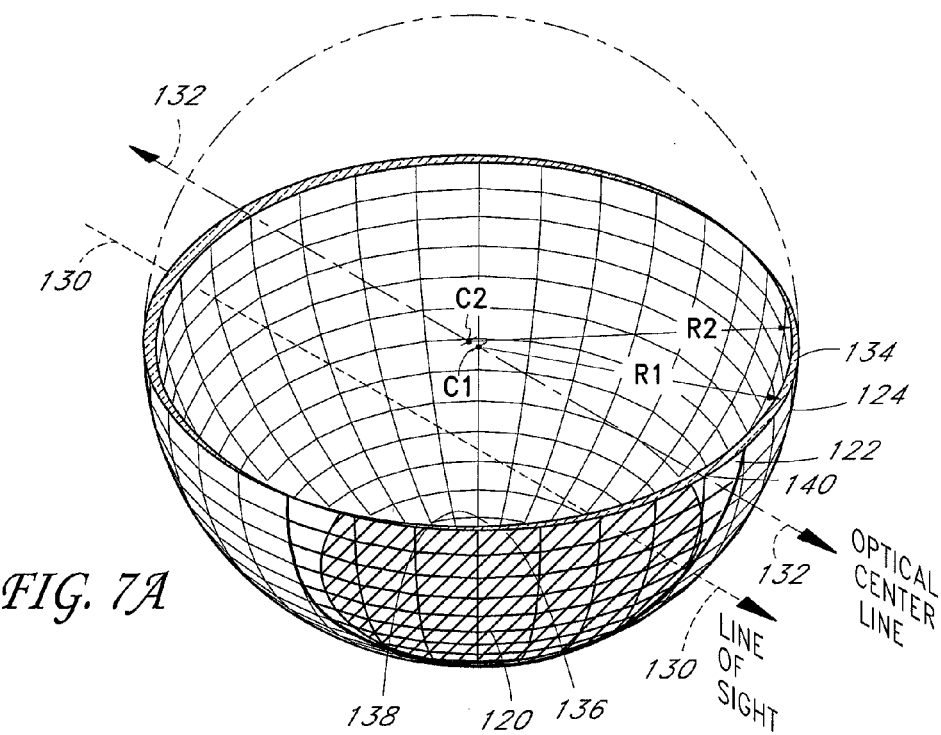
FIG. 7A is a perspective cutaway view of the hollow, tapered wall spherical shape, lens blank, and lens of FIG. 6.

The sphere 124 illustrated in FIGS. 6 and 7A is an imaginary three-dimensional solid walled structure, a portion of the wall of which is suitable from which to cut a lens 120. As is known in the art, precision lens cutting is often accomplished by producing a lens blank 122 from which a lens 120 is ultimately cut. However, it should be clear to those of skill in the art from the illustrations of FIGS. 6 and 7A, that the use of a separate lens blank is optional, and the lens body 120 may be molded directly into its final shape and configuration if desired.

It can also be seen from FIGS. 6 and 7A that the lens 120 and/or the lens blank 122 can be positioned at any of a variety of locations along the sphere 124. In some embodiments, the optical centerline 132 operates as a reference line for orientation of the lens 120 with respect to the sphere 124. In the illustrated embodiment, wherein both the outside surface and the inside surface conform to a portion of a sphere, the optical centerline is defined as the line 132 which joins the two centers C1 and C2. The analogous reference line for the purpose of nonspherical lens geometry may be formed in a manner different than connection of the two geometric centers of the spheres, as will be apparent to one of skill in the art.

The lens 120 is ultimately formed in such a manner that it retains the geometry of a portion of the wall of the sphere as illustrated in FIG. 7A. The location of the lens 120 on the sphere 124 is selected such that when the lens 120 is oriented in the eyeglass frame, the normal line of sight 130 of the wearer through the lens will be maintained generally in parallel to the optical centerline 132 of the geometric configuration from which the lens 120 was obtained. In the illustration of FIGS. 6 and 7A, the lens 120 is a right lens which has a significant degree of wrap, as well as some degree of downward rake (indicated by the as-worn normal line of sight crossing the sphere 124 below the optical centerline 130). A lens having a different shape, or a lesser degree of wrap may overlap the optical centerline 132 of the imaginary sphere 124 from which the lens was formed. However, whether the optical centerline of the imaginary sphere 124 crosses through the lens 120 or not is unimportant, so long as the line of sight 130 in the lens 120 is maintained generally in parallel in the as-worn orientation with the optical centerline 132.

Similarly, if the lens is to have no rake or upward rake in the as-worn orientation, the normal line of sight (and the entire lens) would cross the sphere 124 at or above the central horizontal meridian which contains the optical centerline. The spatial distance and position of the ultimate normal line of sight 130 relative to the optical centerline 132 therefore indicates the degree of wrap (by horizontal distance) and rake (by vertical distance). However, regardless of the distances involved, the lens will exhibit minimal optical distortion as long as the normal line of sight 130 is offset from but maintained substantially parallel to the optical centerline 132 in both the horizontal and vertical planes.

As used herein, "substantially parallel" shall mean that the preselected line of sight 130 when the lens 120 is oriented in the as-worn position generally does not deviate within the horizontal or vertical plane by more than about ±15° from parallel to the optical centerline 132. In some embodiments, the normal line of sight 130 does not deviate by more than about ±10° from the optical centerline 132, and in other embodiments the normal line of sight 130 deviates by no more than about ±5°, while in other embodiments the normal line of sight 130 deviates by no more than about ±2°. In some embodiments, the line of sight 130 is parallel to the optical centerline in the as-worn orientation.

Variations from parallel in the horizontal plane generally have a greater negative impact on the optics than variations from parallel in the vertical plane. Accordingly, the solid angle between the line of sight 130 and optical centerline 132 in the vertical plane may exceed the ranges set forth above, for some eyewear, as long as the horizontal component of the angle of deviation is within the above-mentioned ranges of deviation from the parallel orientation. In some embodiments, the line of sight 130 deviates in the vertical plane no more than about ±10° and, in some embodiments, no more than about ±3° from the optical centerline in the as-worn orientation.

FIG. 7A is a cutaway view of the lens 120, lens blank 122, and geometric shape 124 of FIG. 6. This view shows that the geometric shape 124 is hollow with walls of varying thickness, as revealed by a horizontal cross-section 134 at the optical centerline of the geometric shape 124.

The tapered walls of the geometric shape 124 result from two horizontally offset spheres, represented by their center points C1 and C2 and radii R1 and R2. An outer surface 136 of the lens blank 122 can conform to one sphere (of radius R1) while an inner surface 138 of the lens blank 122 can conform to the other sphere (of radius R2). By adjusting the parameters which describe the two spheres, the nature of the taper of the lens blank 122 may also be adjusted.

In particular, the parameters for the two spheres to which the lens blank outer surface 136 and inner surface 138 conform can be chosen to produce minimal or zero refractive power, or non-prescription lenses. Where CT represents a chosen center thickness (maximum thickness of the wall of the hollow geometric shape 124), n is an index of refraction of the lens blank material, R1 is set by design choice for the curvature of the outer surface 136, R2 may be determined according to the following equation:

$$R_2 = R_1 - CT + \frac{CT}{n} \quad (2)$$

CT/n represents the separation of the spherical centers C1 and C2. For example, where a base 6 lens is desired as a matter of design choice, the center thickness is chosen to be 3 mm, and the index of refraction of one possible material (polycarbonate) is 1.586, R2 may be determined as follows:

$$R_2 = \frac{530}{6} - 3 + \frac{3}{1.586} = 87.225 \text{ mm} \quad (3)$$

For this example, the radius R1 of the outer surface 136 is equal to 88.333 mm, the radius R2 of the inner surface 138 is equal to 87.225 mm, and the spherical centers C1 and C2 are separated by 1.892 mm. These parameters describe the curvature of the lens blank 122 of a decentered spherical embodiment.

In the case of some embodiments, the optical centerline 132 is that line which passes through both center points C1 and C2 of the offset spheres. This happens to pass through the thickest portion of the geometrical shape 124 walls at an optical center 140, though this may not be true for nonspherical embodiments. The optical center line 132 happens to pass through surface 136 of the illustrated lens blank 122, although this is not necessary. The optical center 140 does not happen to lie on the lens 120, although it may for larger lenses or lenses intended to exhibit less wrap in the as-worn orientation.

Figure 7B:
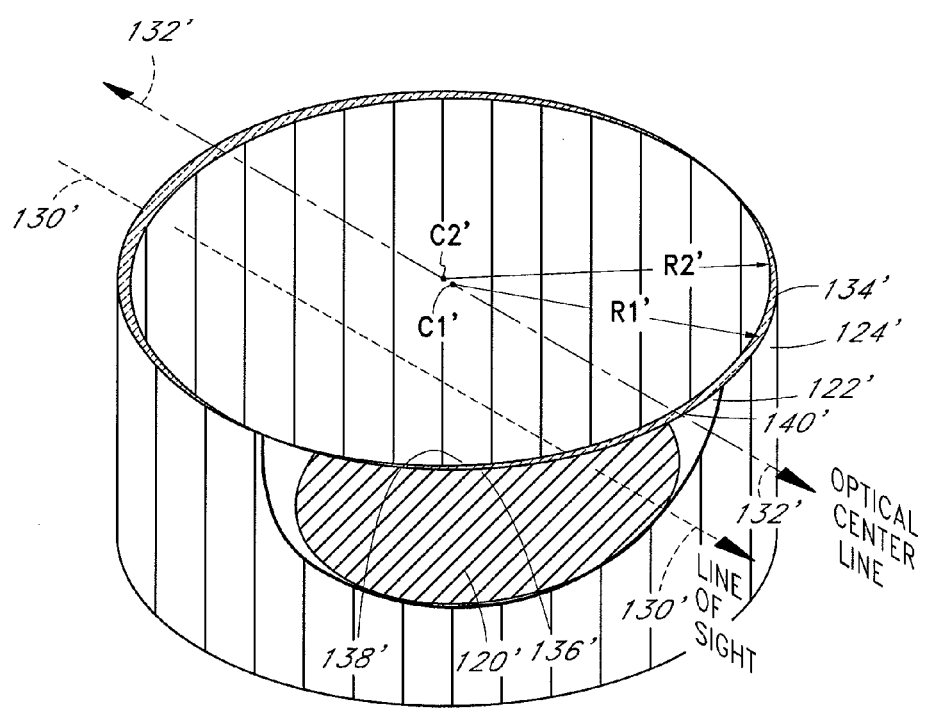
FIG. 7B is a perspective cutaway view of a lens blank conforming to a portion of the surface of a hollow, tapered wall cylindrical shape, and a lens profile to be cut from the blank.
Figure 8A:
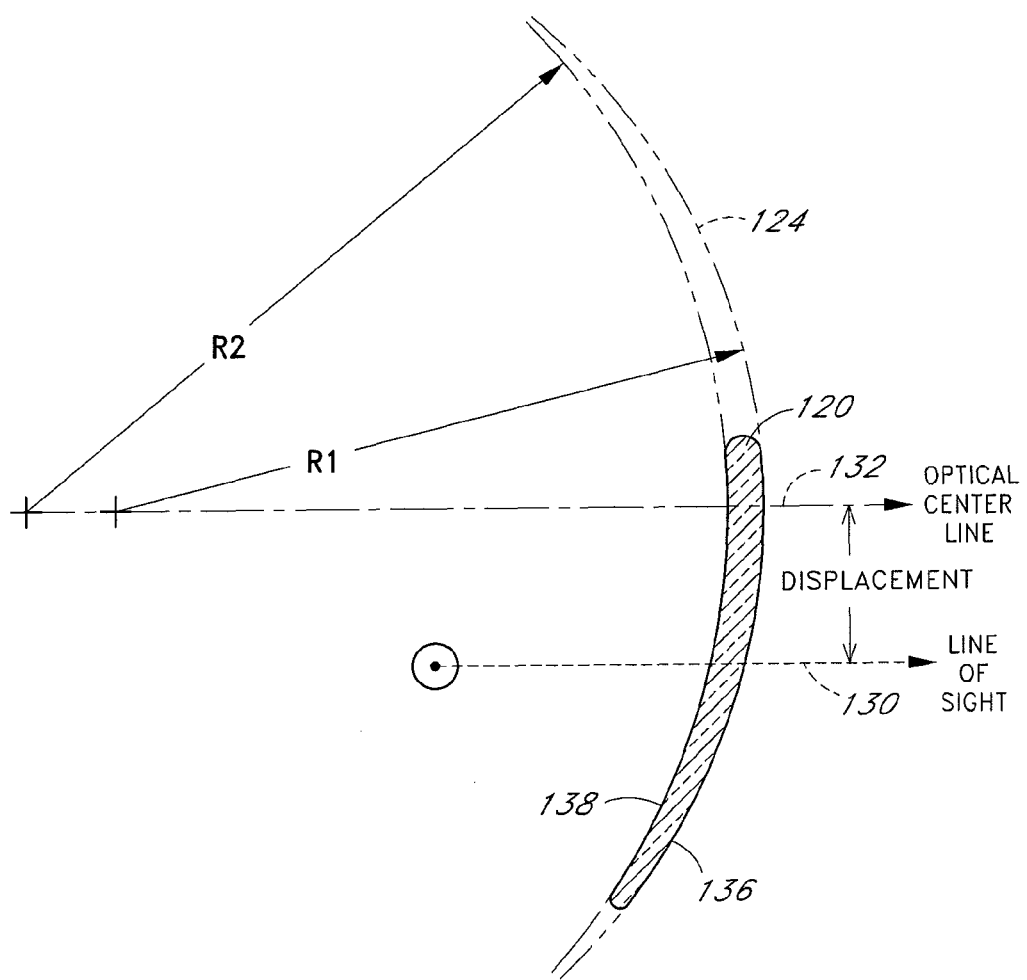
FIG. 8A is a vertical cross-sectional view of a lens for 3D eyewear which is curved in a vertical plane.

FIG. 7B is a cutaway view of a lens 120', lens blank 122', and geometric shape 124' which can be similar in many ways to FIG. 7A, except that the geometric shape 124' of FIG. 7B is a cylinder. The cross-section of FIG. 7B was taken along a horizontal plane that intersects the lens 120'. The cylinder 124' can be hollow and can have walls of varying thickness. The cylindrical lens blank 122' can have an outer surface 136' that conforms to the shape of a right circular cylinder having a center point C1' at the horizontal cross-sectional plane and a radius R1', and an inner surface 138' that conforms to the shape of a second right circular cylinder having a center point C2' at the horizontal cross-sectional plane and a radius R2'. An optical centerline 132' is defined by a line that passes through both center points C1' and C2'. It will be understood that because the cylinders are uniform in the vertical axis, the cylinders can each define a centerline, and a plane that intersects the two centerlines of the cylinders can represent the optical center of the lens blank 122'. The center points C1' and C2' and the optical center line 132' shown in FIG. 8A are positioned where the horizontal cross-sectional plane intersects the first and second cylinder centerlines and the optical center plane respectively.

The center point C2' of the inner surface 138' can be offset from the center point C1' of the outer surface 136', and the radii (R1' and R2') of the outer and inner surfaces 136', 138' can be equal, or the radius R1' of the outer surface 136' can be larger than the radius R2' of the inner surface 138', for example, as dictated by equation (2) above. If the center points C1' and C2' are sufficiently offset, the radius R2' can be greater than the radius R1'. In one example embodiment, the centers C1' and C2' are separated by 1.892 mm and the radius R1' is equal to 83.333 mm and R2' is equal to 87.225 mm. FIG. 8A illustrates a vertical cross-section of the lens 120 of FIG. 7A, also showing in phantom the geometric shape 124, which in FIG. 8A is a sphere, to which the outer surface 136 and inner surface 138 conform. In the embodiment shown, the optical centerline 132 can pass through the vertical profile of the lens 120. The optical centerline 132 associated with the chosen taper is also aligned to be generally parallel with, and displaced from, the normal line of sight 130 of the wearer in the as-worn orientation.

Figure 8B:
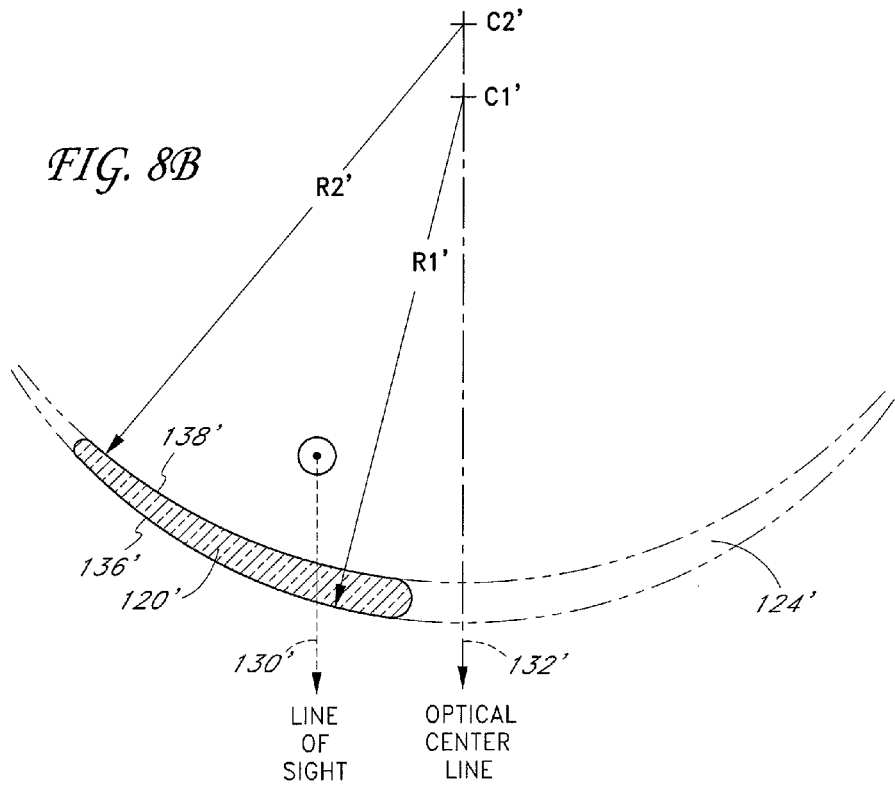
FIG. 8B is a horizontal cross-sectional view of a tapered lens for 3D eyewear.
Figure 9:
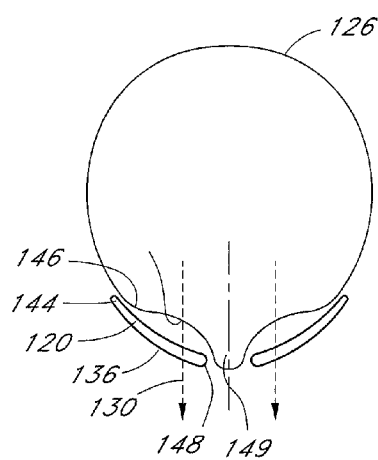
FIG. 9 is a top plan view of lenses showing a high wrap in relation to a wearer.

FIG. 8B illustrates a horizontal cross-section of a lens 120' of FIG. 7B, showing in phantom the geometric shape 124' (e.g., the cylinder) to which the outer surface 136' and inner surface 138' conform. The lens blank 122' is omitted from this drawing. It will be understood that the spherical lens 120 (as shown in FIGS. 7A and 8A) can also have a horizontal cross-section that is similar to, or the same as, that shown in FIG. 8B. In some embodiments, the optical centerline 132' associated with the chosen orientation is aligned to be generally parallel to but offset from the straight ahead normal line of sight 130' of the wearer as the lens 120' is to be mounted in an eyeglass frame.

Thus, in addition to providing optically correct lenses for dual lens 3D eyewear with a high degree of wrap, some embodiments provide optically corrected lenses for 3D eyewear characterized by a degree of rake. The terms "rake" and "optically correct" are further defined below.

In general, "rake" will be understood to describe the condition of a lens, in the as-worn orientation, for which the normal line of sight 130 (see FIG. 8A) strikes a vertical tangent to the lens 120 at a non-perpendicular angle. For optically corrected 3D eyewear in accordance with some embodiments, however, the normal line of sight to a raked lens is generally parallel to and vertically offset from the optical centerline. Therefore, the degree of rake in a correctly oriented lens may be measured by the distance which the normal line of sight is vertically displaced from the optical centerline.

Figure 10C:
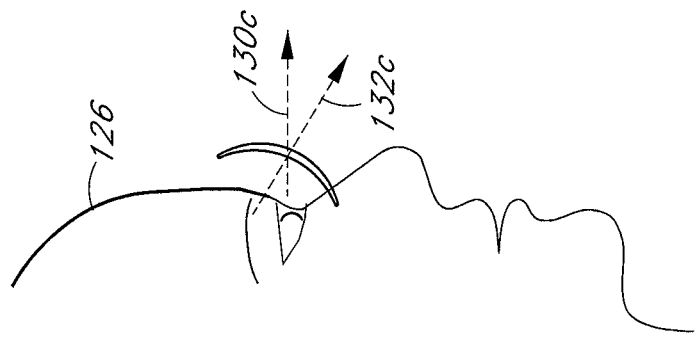
FIGS. 10A-10C are right side elevational views of lenses of various configurations and orientations relative to a wearer.
Figure 10B:
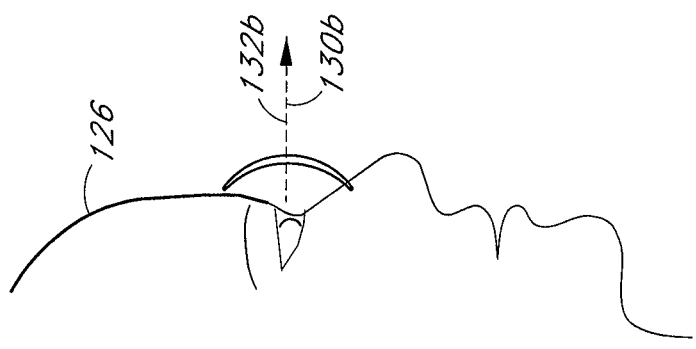

For a centrally oriented lens, as shown in FIG. 10B, the wearer's line of sight coincides with the optical centerline, thus displaying no vertical displacement. While such a lens may be optically corrected (as defined below) in the as-worn orientation, the lens does not have rake. FIG. 10C shows a lens orientation which is downwardly tilted or raked, but for which the optical centerline and the normal line of sight are highly divergent such that no "displacement" could meaningfully be measured. While such a lens may have downward rake in a conventional sense, advantageously providing downward protection for the eye and conforming to the wearer's face, it is not optically corrected in the vertical direction.

Figure 10A:
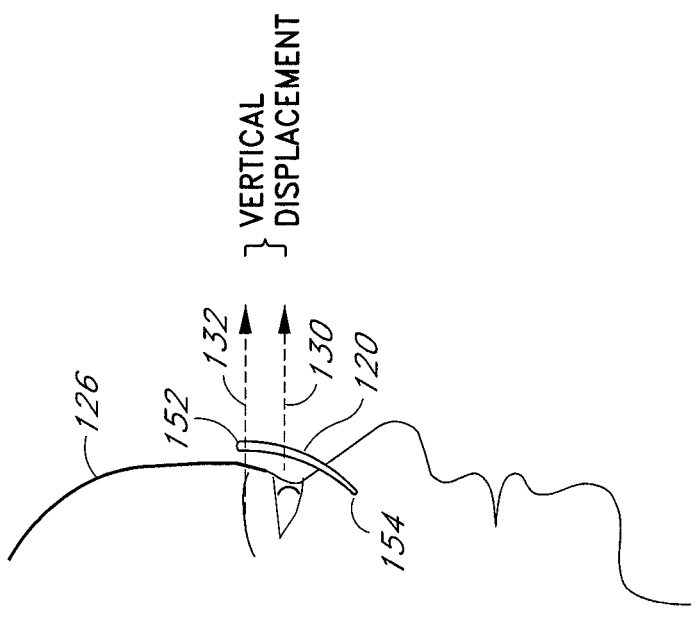

In contrast, the normal line of sight through the raked lens shown in FIG. 10A, is characterized by a finite vertical displacement from the optical centerline. FIG. 10A shows a downward displacement used to produce a downward rake. Where the optical centerline diverges from the normal line of sight within the acceptable angular ranges set forth above, this displacement should be measured at or near the lens surface. The displacement may range from about any non-zero displacement to about 8.0 inches. Lenses of lower base curvature may require a greater displacement in order to achieve good rake. The vertical displacement for a lens of base 6 curvature, however, should be between about 0.1 inch and about 2.0 inches. In some embodiments, the vertical displacement is between about 0.1 inch and about 1.0 inch, particularly between about 0.25 inch and about 0.75 inch, and can be about 0.5 inch.

"Optically correct," as that term has been used herein, refers to a lens which demonstrates relatively low distortion as measured by one or more of the following values in the as-worn orientation: prismatic distortion, refractive power, and astigmatism. Lenses in accordance with some embodiments demonstrate prismatic distortion at least as low as ¼ diopters or 3/16 diopters and often less than about ⅛ diopters. In some embodiments the prismatic distortion is less than about 1/16 diopters or less than about 1/32 diopters. Refractive power and astigmatism for lenses in accordance with the some embodiments are also low. Each of refractive power and astigmatism are also at least as low as ¼ diopters or 3/16 diopters and can be less than about ⅛ diopters, 1/16 diopters, or 1/32 diopters. It will be understood by the skilled artisan that the advantages in minimizing optical distortion apply to both the horizontal and the vertical dimensions. Particular advantage is derived by applying the principles taught herein to both vertical and horizontal dimensions of the lens, enabling the combination of lateral and lower peripheral protection of the eyes (through wrap and rake) with excellent optical quality over the wearer's full angular range of vision. In some embodiments, a lens can be optically corrected in a first direction (e.g., along a horizontal axis) and not be optically corrected along a second direction (e.g., along a vertical axis).

Furthermore, although the principal embodiments described herein are of cylindrical and spherical shapes having constant radii in the horizontal and/or vertical cross-sections, a variety of lens configurations in both planes are possible. Thus, for example, either the outer or the inner or both surfaces of the lens of some embodiments can generally conform to a spherical shape as shown in FIGS. 6 and 7A, or to a right circular cylinder as shown in FIG. 7B. Alternatively either the outer or the inner or both surfaces of the lens may conform to a frusto-conical shape, a toroid, an elliptic cylinder, an ellipsoid, an ellipsoid of revolution, other asphere or any of a number of other three dimensional shapes. Regardless of the particular vertical or horizontal curvature of one surface, however, the other surface may be chosen such as to minimize one or more of power, prism, and astigmatism of the lens in the mounted and as-worn orientation. FIGS. 9-12 will aid in describing a method of choosing a location on the lens blank 122 from which to cut the right lens 120, in accordance with some embodiments. It will be understood that a similar method would be used to construct the left lens for the dual lens 3D eyewear.

As a first step, a desired general curvature of the lens inner or outer surface 138, 136 may be chosen. For the lens 120, this choice determines the base value of the lens blank 122. As noted elsewhere herein, a number of other curvatures may be utilized. A choice of lens thickness may also be preselected. In particular, the minimum thickness may be selected such that the lens will withstand a preselected impact force.

Figure 12:
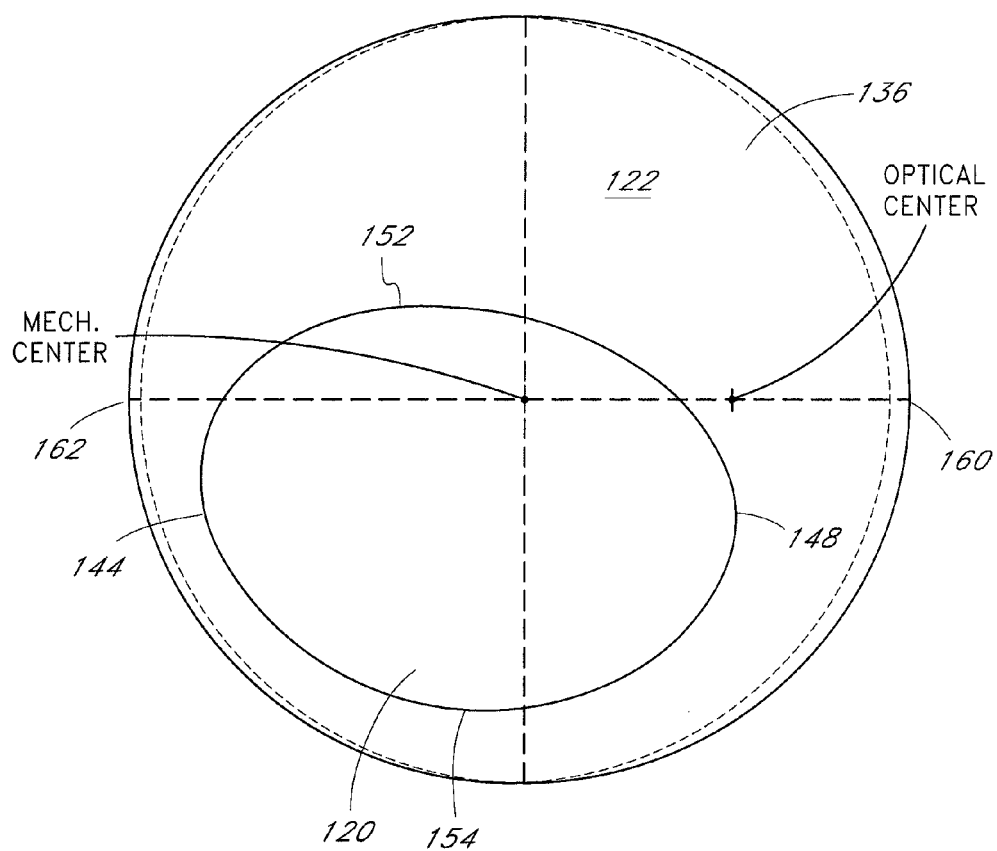
FIG. 12 is a top plan view of the right lens and front (convex surface) of the lens blank of FIG. 6, rotated to project the mechanical centerline of the blank normal to the page.

A desired lens shape may also be chosen. For example, FIG. 12 illustrates an example of a front elevational shape for the lens 120. The particular shape chosen is generally not relevant to the oriented decentered lens optics disclosed herein.

A desired as-worn orientation for the lens should also be chosen, relative to the normal line of sight 130 of the wearer 126. As mentioned above, some orientations may provide significant lateral wrap for lateral protection and interception of peripheral light, and for aesthetic reasons, and also some degree of downward rake. For example, some embodiments can use a canted lens 120 to achieve wrap. Alternatively, wrap may be achieved through use of a higher base lens and a more conventional (non-canted) orientation. FIGS. 9 and 10A-C illustrate more plainly how the orientations may be related to the line of sight 130 of the wearer.

The 3D eyewear designer may also choose a degree of rake, or vertical tilt, as will be understood from FIGS. 10A-10C, schematically illustrating various vertical as-worn orientations of a lens, relative to the head of the wearer 126. FIG. 10A illustrates an orientation of the lens 120 relative to the head of the wearer 126, and relative in particular to the straight ahead normal line of sight 130. A downward rake, as illustrated in FIG. 10A, is desirable for a variety of reasons, including improved conformity to common head anatomy. As will be apparent to those of skill in the art in view of the disclosure herein, a lens 120 having a mechanical center point which falls below the horizontal plane intersecting the optical centerline 132 (see FIG. 7) will permit the lens to be oriented with a downward rake as illustrated in FIG. 10A and yet preserve a generally parallel relationship between the optical centerline and the straight ahead line of sight. Since the orientation of the lens 120 to the optical centerline 132 in the imaginary sphere should be the same as the orientation between the lens 120 and a parallel to the normal line of sight 130 in the as-worn orientation any lens cut from this sphere below the optical centerline 132 can be mounted with a corresponding degree of downward rake and achieve the optical correction described herein.

Accordingly, the desired degree of rake may be chosen by specifying a vertical component of the displacement between the normal line of sight 130 and the optical centerline 132, as illustrated in FIG. 10A. Either way, the greater the displacement, the greater the downward rake. In some embodiments, the vertical displacement will be greater than zero. Generally it will be from about 0.1 inches to about 2 inches depending upon base curvature. In some embodiments, vertical displacement will be from about 0.1 inches to about one inch, or about 0.2 inches or greater. In some embodiments, it will be from about 0.25 inches to about 0.75 inches and in one embodiment it was about 0.5 inches.

Alternatively, a general profile may be chosen which fixes an orientation of the normal line of sight relative to the curvature of the lens (not accounting for the thickness of the lens). For instance, both FIG. 10A provides reference points of a top edge 152 and a bottom edge 154 relative to the normal line of sight 130. This relationship may then be utilized to determine the position on a lens blank from which to cut the lens, as will be clear from the discussion of FIG. 11A below.

Figure 11:
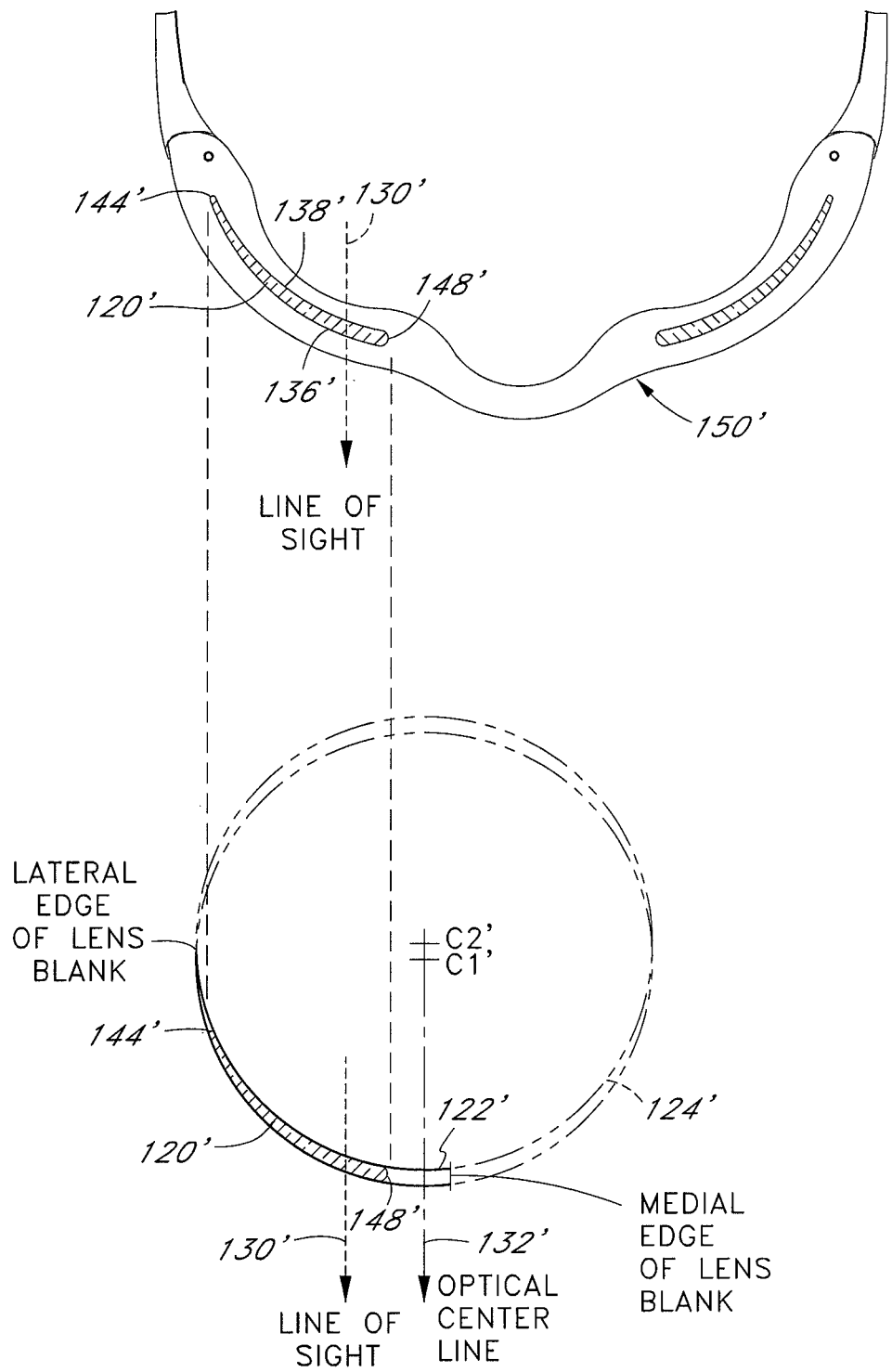
FIG. 11 schematically illustrates the projection of a lens horizontal profile from a desired orientation within an eyewear frame to the lens blank.

Referring now to FIG. 11, a mapping of the horizontal orientation of the cylindrical lens 120' of FIG. 7B onto the lens blank 122' is illustrated. The normal line of sight 130', with respect to which the chosen orientation is measured, is maintained substantially parallel to and offset from the optical centerline 132'. The horizontal component of the displacement will generally be within the range of from about 0.1 inches to about 8 inches for lower base curvatures.

Once the aesthetic design and desired rake and wrap orientation such as that illustrated in FIG. 11 has been determined (such as by the chosen frame 150'), and the lens blank 122' formed having a suitable base curvature for fitting within the aesthetic design, the aesthetic design may be "projected" graphically or mathematically onto the surface of the theoretical cylinder or blank to reveal that portion of the cylinder which is suitable for use as the lens 120'. The projection of the lens shape onto the cylinder should be moved about the surface of the cylinder until it is positioned such that the lens cut from the cylinder at that location will exhibit the appropriate wrap for the aesthetic design without any rotation of the lens 120' out of its orientation in which the optical centerline of the cylinder is generally parallel to the desired normal line of sight in the as-worn orientation. For a lens blank that is substantially uniform in the vertical direction (e.g., a cylindrical lens blank 122'), the lens 120' may be cut from any suitable location in the vertical direction, and in some cases, no projection in the vertical direction is needed. In some cases, multiple lenses may be cut from a single cylindrical lens blank, as will be described in greater detail below.

Figure 11A:
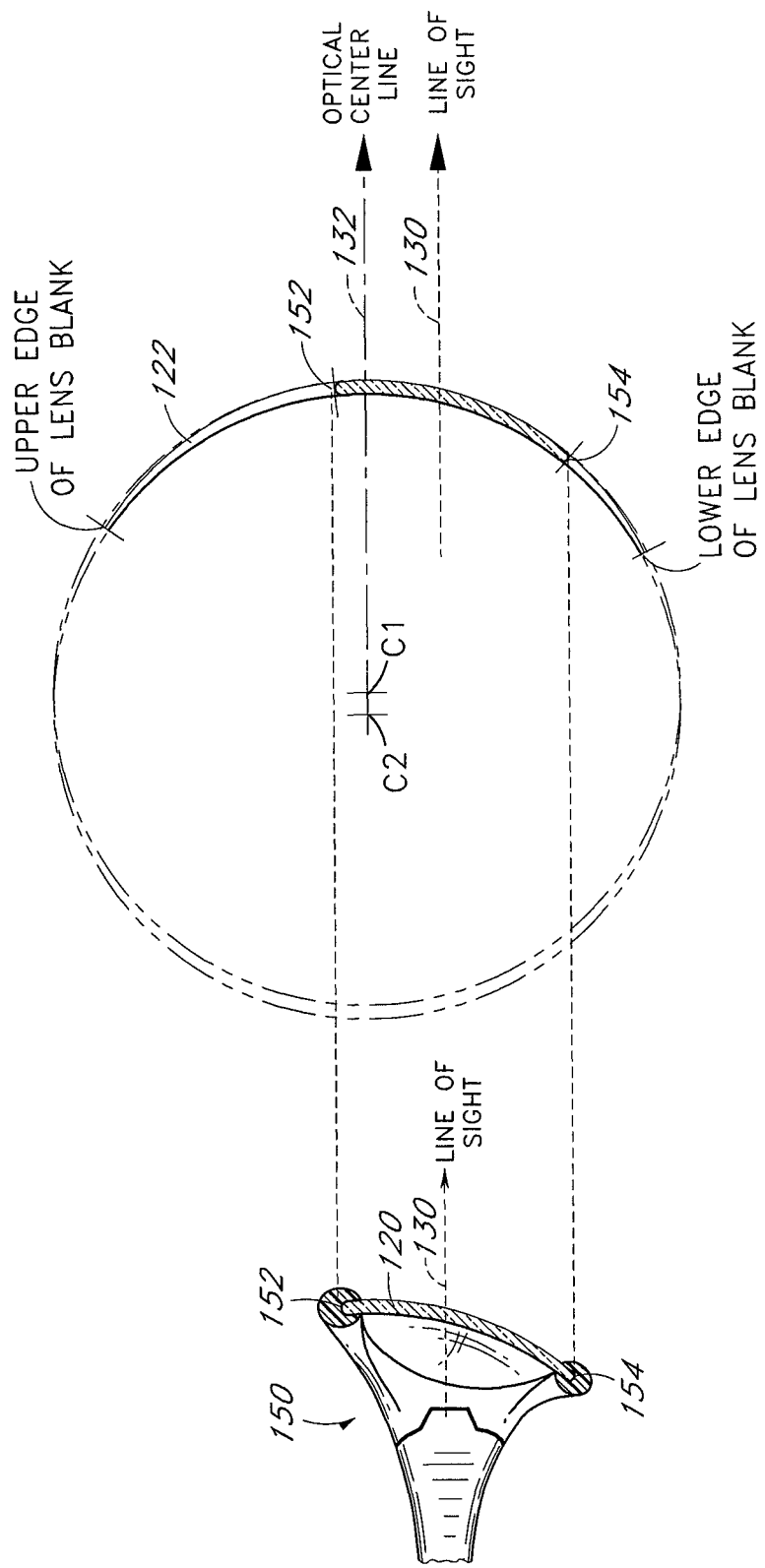
FIG. 11A schematically illustrates the projection of a lens vertical profile from a desired orientation within an eyewear frame to the lens blank.

For some lenses (e.g., spherical or toroidal) a projection can be made in the horizontal direction similar to that shown in FIG. 11, and a similar simultaneous projection may be performed for the vertical orientation chosen, as depicted in FIG. 11A. FIG. 11A schematically represents a projection from the chosen frame 150 to a position on a the lens blank 122 that is curved in the vertical direction (e.g., conforming to the surface of a sphere). The frame 150 (or a conceptual configuration such as provided by FIG. 10A) provides reference points in the form of the lens top edge 152 and bottom edge 154 in relation to the line of sight 130. The projection may then be shifted up or down until the top edge 152 and the bottom edge 154 are both simultaneously aligned with corresponding points on the outer surface 136 of the lens blank, while maintaining the line of sight 130 substantially parallel with the optical centerline 132.

Projection of both the horizontal profile and the vertical profile may be performed simultaneously, locating a unique position on the lens blank 122 corresponding to the desired three-dimensional shape of the lens (including the front elevational shape shown in FIG. 12) at which the line of sight 130 is parallel to the optical centerline 132 or other reference line of the lens blank 122. Of course, it will be understood that the lines 130 and 132 may be substantially parallel, that is, within the acceptable range of angular deviation set forth above.

This shape may then be cut from the blank 122 or molded directly in the final lens configuration. The resultant lens 120 not only conforms to the desired shape, but also minimizes prismatic distortion when in the as-worn orientation.

FIG. 12 illustrates a lens blank 122, concave towards the page such as that shown conforming to a portion of the surface of the sphere in FIGS. 6 and 7A. In FIG. 12, the lens blank 122 has been formed on the theoretical sphere such that the mechanical center of the blank is illustrated in the center of the drawing on the central horizontal meridian. The illustrated lens profile 120 has a medial edge 148, a lateral edge 144, an upper edge 152 and a lower edge 154. The medial edge 148 of the right lens 120 lies close to the optical center of the lens blank 122.

At least a portion of the right lens 120 lies in the lower left-hand (third) quadrant of the lens blank 122. In some embodiments exhibiting both wrap and downward rake, at least about half of the lens area will fall within the third quadrant of the lens blank 122. In some embodiments all or substantially all of the area of the lens 120 will lie below and to the left of the optical center as illustrated. Lenses exhibiting a similar degree of rake but lesser wrap may be positioned on the lens blank 122 such that as much as 50% or more of the lens area is within the lower right (second) quadrant of the lens blank 122.

Figure 12A:
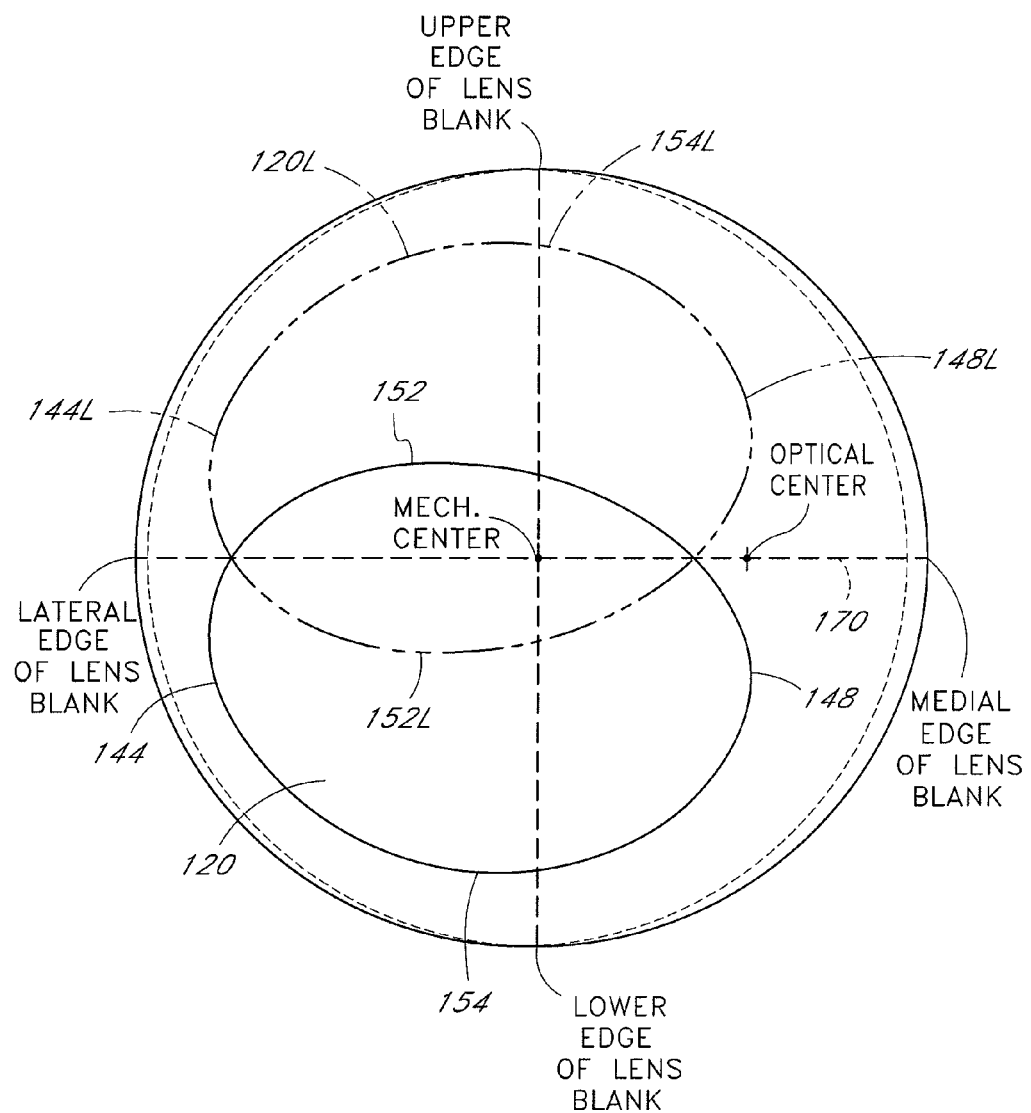
FIG. 12A is a top plan view, like that of FIG. 12, additionally showing the position from which a left lens could have been cut from a similarly shaped lens blank.

FIG. 12A illustrates the position on the same lens blank 122 from which a left lens 120L could be cut. The left lens 120L has a medial edge 148L, a lateral edge 144L, an upper edge 152L and a lower edge 154L. The left lens 120L is drawn in phantom because both the right lens 120 and the left lens 120L for the illustrated profile cannot be cut from the same lens blank 122. Rather, the illustrated left lens 120L would be cut from the position shown on a second lens blank which has a shape identical to the first lens blank 122. In some embodiments, the first and second lens blanks have the same shape but have different orientations of polarization so that the right and left lenses 120, 120L are configured to enable 3D viewing by blocking left-eye (e.g., left-hand circularly polarized) image and right-eye (e.g., right-hand circularly polarized) images respectively.

As the shape of left lens 120L should be symmetrically opposite to the right lens 120, the shape of left lens 120L is a mirror image of the shape of right lens 120. For example, the image of the right lens 120 may be flipped across a vertical plane through which the optical centerline 130 and poles of the sphere 124 pass. The lens blank upon which that image would be projected may be identical to the illustrated lens blank 122, but rotated 180° about the mechanical center.

Alternatively, the shape of left lens 120L may also be considered the mirror image of the shape of right lens 120 across an axis of vertical symmetry. As illustrated in FIG. 12A, the left lens 120L is upside-down relative to the right lens 120. For lens blank 122, the axis of vertical symmetry is a central horizontal meridian 170 which divides the lens blank 122 into upper and lower halves, each of which conform to upper and lower hemispheres of the sphere 124 (FIGS. 6 and 7A). Thus, the horizontal position (i.e., distance from the medial or lateral edge of the lens blank 122) for each of the medial edge 148L, lateral edge 144L, upper edge 152L and lower edge 154L, is the same for corresponding points of the right lens 120. Corresponding points on the left and right lenses are also the same vertical distance from the horizontal meridian 170, but in the opposite directions. For example, the upper edge 152L of the left lens 120L is about the same distance above the horizontal meridian 170 as the upper edge 152 of the right lens 120 is below the horizontal meridian 170.

Thus, the left lens 120L of some raked dual lens embodiments is cut substantially from the upper half of lens blank 122, while the right lens 120 is cut substantially from the lower half of an identically-shaped lens blank. For some embodiments displaying both wrap and rake, the left lens 120L is cut substantially from the upper left (fourth) quadrant of lens blank 122, while the right lens is cut substantially from the third quadrant. "Substantially," as used in this context, refers to more than 50% of the surface area of the lens 120 or 120L falling within the relevant half or quadrant of lens blank 122.

Of course, this description is limited to a lens blank 122, which is described by an optical centerline passing through the central horizontal meridian 170 (i.e., the lens blank 122 taper is vertically symmetrical) but not through the mechanical center (i.e., the lens blank 122 taper is horizontally asymmetrical). It will be understood that alternative lens blanks may utilize alternative tapering. The skilled artisan may adjust the positions from which to cut the right and left lenses such that the normal line of sight in the as-worn orientation is maintained substantially parallel to the optical centerline, regardless of the tapering symmetry.

Some embodiments thus provide a precise method of furnishing the correct correspondence between taper and the varying angle of incidence from the wearer's eye to the surface of a lens. By using the relationship among the wearer's line of sight and the form of taper, a variety of lens designs are available while minimizing astigmatism, power and prismatic distortion. For example, a designer may choose a desirable orientation and curvature for the lens, relative to a wearer's line of sight. The orientation and curvature may be chosen from a wide range of rake, wrap, base value and proximity to a wearer's face. The form of taper and location of the lens profile on the theoretical sphere or other shape may then be chosen such that the prismatic distortion in the as-worn orientation is minimized.

Figure 13:
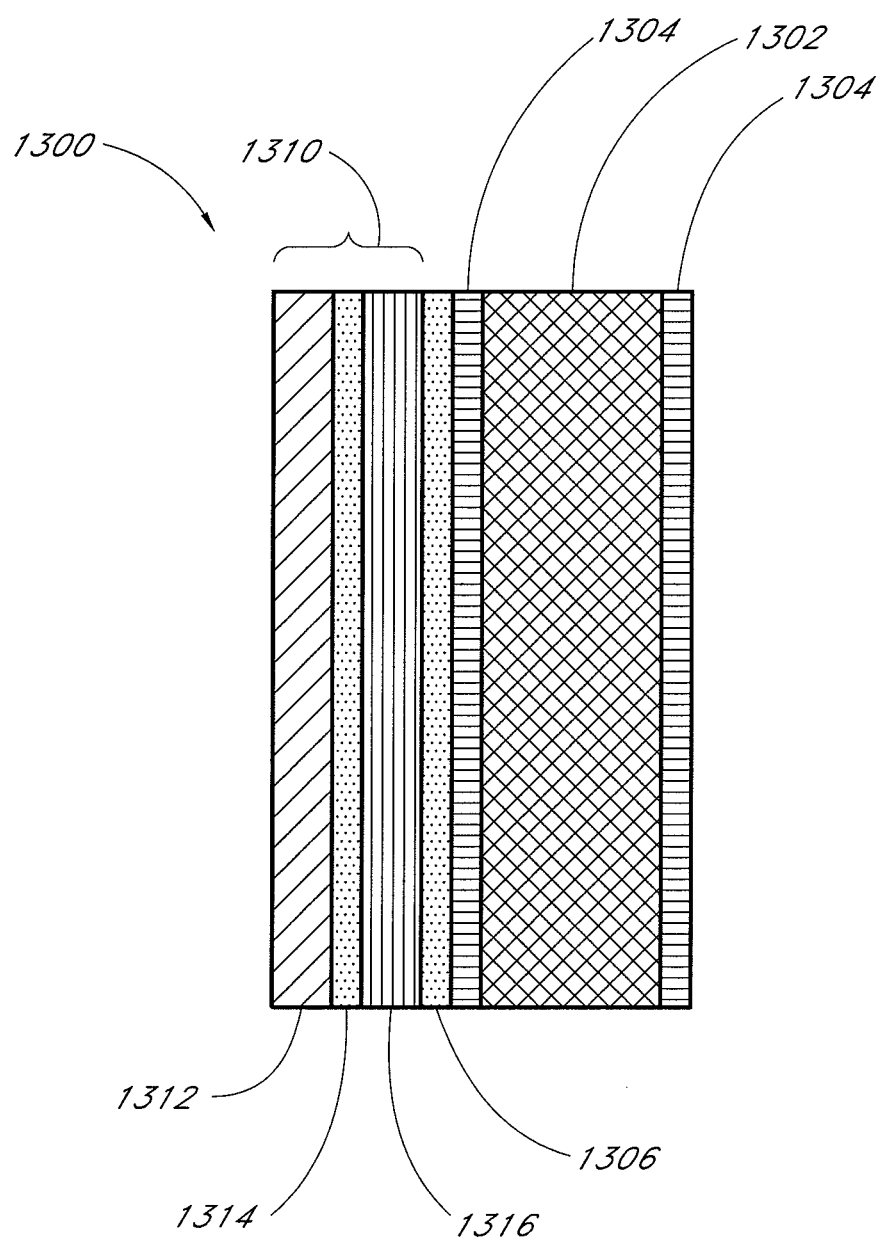
FIG. 13 schematically illustrates an example of a multilayered lens for use with 3D eyewear.

FIG. 13 schematically illustrates a cross sectional view of a not to scale embodiment of a multilayered lens 1300 for use with 3D eyewear. The lens 1300 can include a lens body 1302 formed of polycarbonate, CR-39, glass, or other suitable material. The lens body 1302 can be rigid and dictate the shape of the composite lens 1300. A circular polarizer 1310 is applied to the front surface (furthest from the wearer's eye) by an adhesive layer 1306. In some embodiments, a hardcoat 1304 can be applied to front and back surfaces of the lens body 1302, and the adhesive layer 1306 can be applied forward the hardcoat layer 1304. The circular polarizer 1310 can include a quarter-wave plate 1312 and a linear polarizer 1316 jointed by an adhesive layer 1314, or other suitable bonding layer, preferably with the fast axis of the quarter-wave plate 1312 offset from the transmission axis of the linear polarizer by about 45°. The linear polarizer can be an iodine-based polarizer and/or can include dichroic dyes that yield polarization. The circular polarizer, in some embodiments, is sensitive to heat (e.g., over 80° or 90° Celsius). Accordingly, in some embodiments, the lens 1300 can be assembled without applying heat to the circular polarizer 1310, as described herein, thereby preserving high polarization efficiency for the 3D lens 1300.

In some embodiments the circular polarizer 1310 and adhesive layer 1306 can have a combined thickness of at least about 1.0 mm and/or less than or equal to about 2.0 mm, or of about 1.5 mm. The lens body 1302 can have a thickness of at least about 1.0 mm and/or less than or equal to about 2.0 mm, or of about 1.4 mm. Other thicknesses for the layers of lens 1300 can be used.

Certain layers shown in the embodiment illustrated in FIG. 13 can be omitted. For example, in some cases, no hardcoat 1304 is used. Additional layers may be added that are not specifically shown in FIG. 13. For example, an antireflective coating can be applied to the front and/or back surfaces of the lens 1300. Also, in some embodiments, an additional hardcoat layer, or other protective layer can be formed on the front surface of the lens so as to protect the circular polarizer 1310 from scratches or other damage. In some cases, the circular polarizer 1310 can include a coating of cellulose triacetate (TAC) or other coating on its front and/or back surfaces. In some cases the circular polarizer 1310 is positioned as the layers furthest from the wearer's eye, and no additional layers are disposed forward of the circular polarizer 1310. Thus, light from the 3D image that passes through the lens 1300 to the wearer's eye contacts the circular polarizer 1310 before any other layers of the lens 1300. This can result in highly efficient filtering of light by the circular polarizer 1310 because the light is not refracted or otherwise modified by any layers of the lens 1300 before it contacts the circular polarizer.

Figure 14:
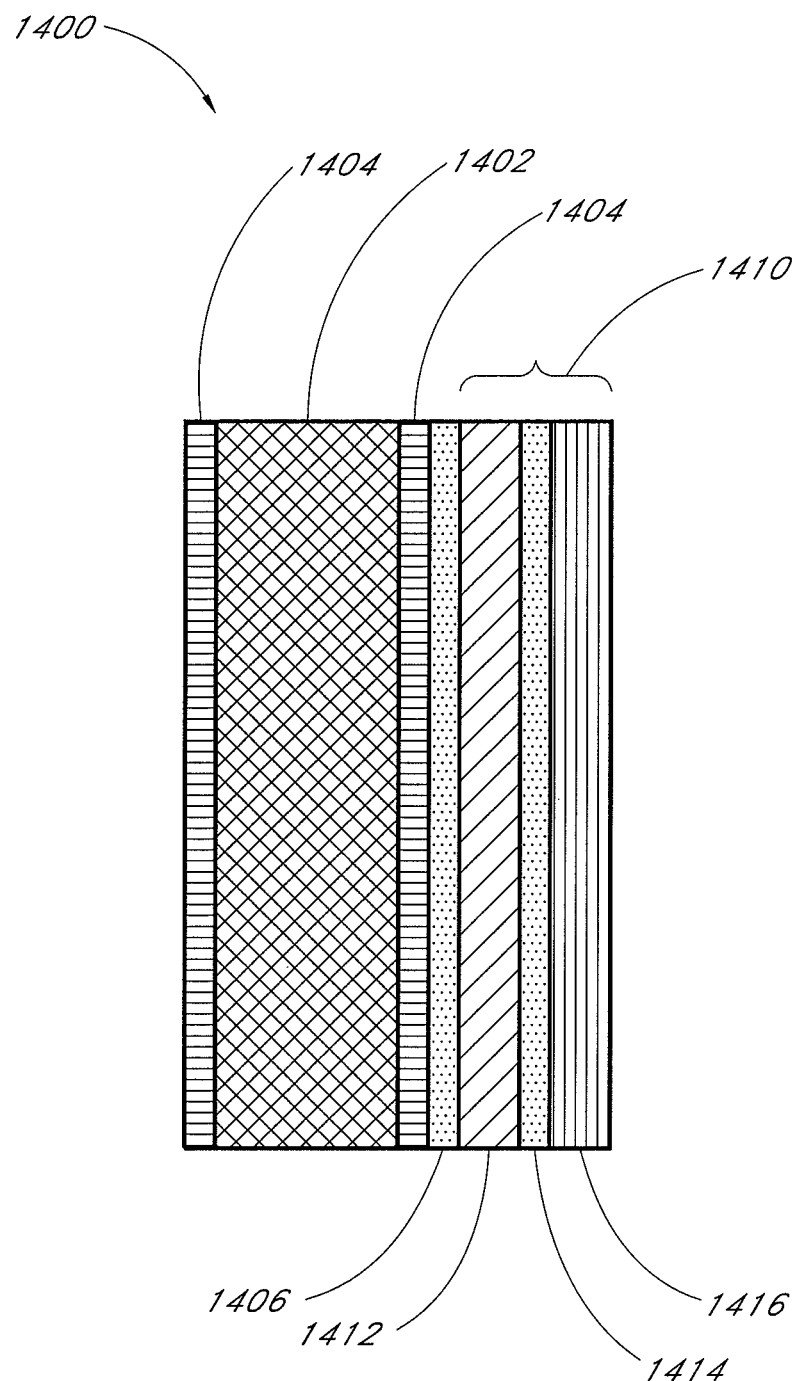
FIG. 14 schematically illustrates another example of a multilayered lens for use with 3D eyewear.

The layers of the lens 1300 illustrated in FIG. 13 can be rearranged. For example, FIG. 14 schematically illustrates an example of a multilayered lens 1400 in which the circular polarizer 1410 is applied to the back surface (closest to the wearer's eye) of a lens body 1402 using an adhesive layer 1406. The circular polarizer 1410 includes a quarter-wave plate 1412, an adhesive layer 1414, and a linear polarizer 1416. In some cases, a hardcoat layer 1404 can be applied to the front and/or back surfaces of the lens body 1402. In the embodiment of FIG. 14, the adhesive layer 1406 is applied to the quarter-wave plate 1412, rather than to the linear polarizer 1416 (as in FIG. 13), so that the circular polarizer 1410 is oriented with the quarter-wave plate 1412 further from the wearer's eye than the linear polarizer 1416. In this embodiment, the circular polarizer 1410 can be better protected from scratches or other damage because generally the back side of the lens 1400 is better protected (e.g., by the concave shape of the lens or by the earstems of the eyewear).

Figure 15:
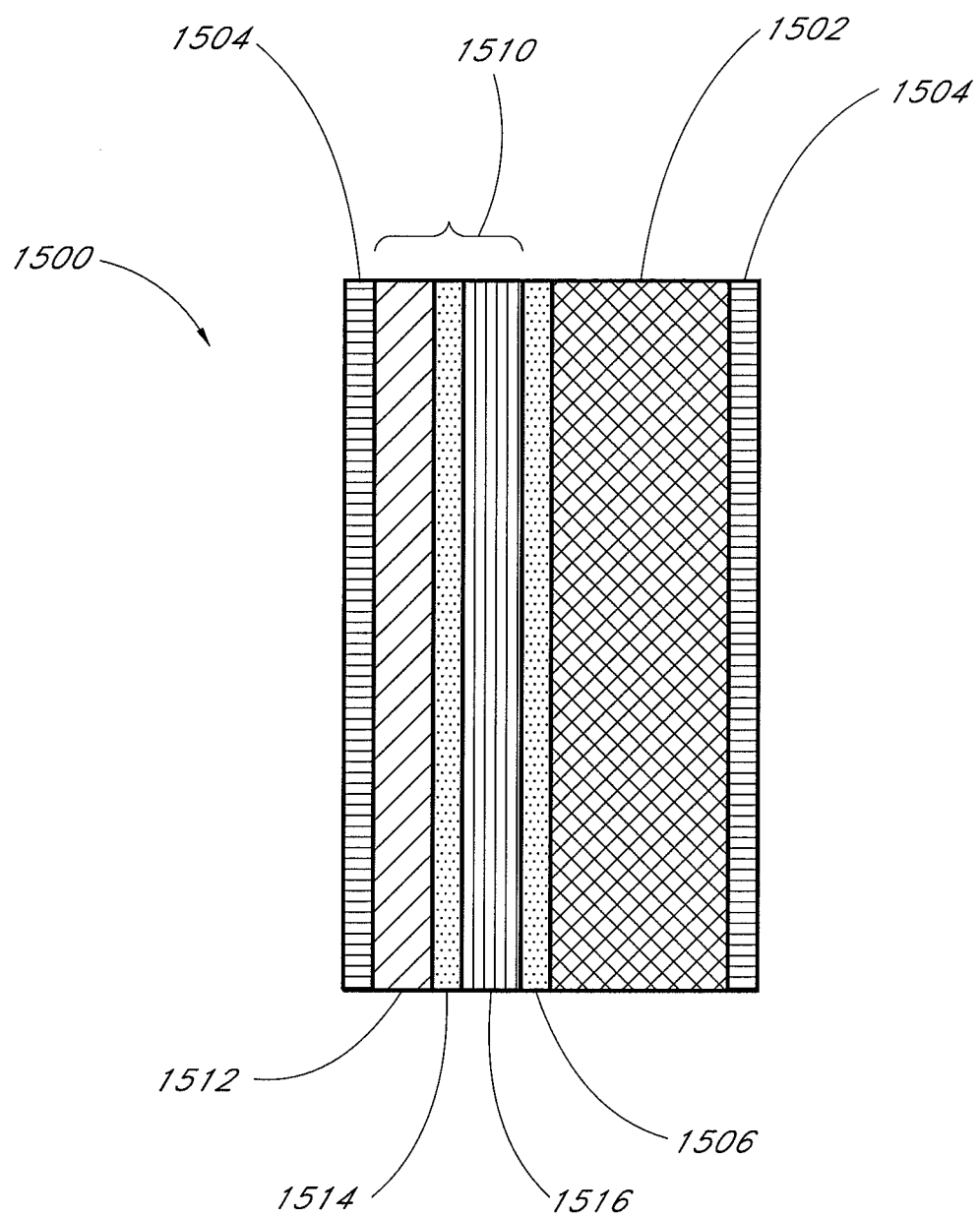
FIG. 15 schematically illustrates another example of a multilayered lens for use with 3D eyewear.

FIG. 15 schematically illustrates an embodiment of a multilayered lens 1500 that can be similar to or the same as the lenses of FIGS. 13 and 14 in many regards. The lens 1500 can include a circular polarizer 1510 (having a quarter-wave plate 1512, adhesive layer 1514, and linear polarizer 1516) attached to the front of the lens body 1502 using an adhesive layer 1506. A hardcoat 1504 can be applied to the back surface of the lens body 1502 and to the front surface of the circular polarizer 1510. In this embodiment, the circular polarizer 1510 can be protected from damage by the hardcoat 1504, while also being positioned forward of the other layers of the lens 1500 such that the light reaches the circular polarizer 1510 after only propagating through the hardcoat layer 1504.

Figure 16:
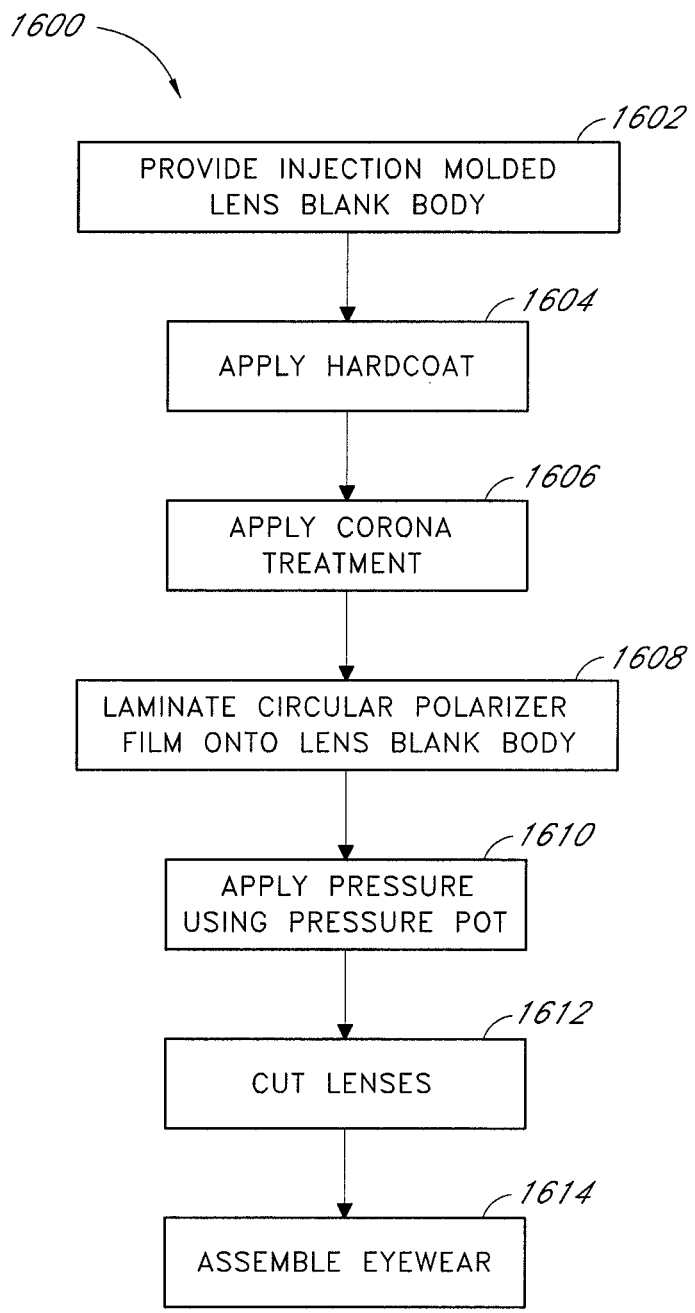
FIG. 16 is a flow chart showing an example process for forming 3D eyewear including the lens of FIG. 13.

FIG. 16 is a flowchart showing an example method 1600 for producing 3D eyewear having lenses configured for 3D viewing. FIG. 16 will be described in connection with a lens having the structure shown in lens 1300 of FIG. 13, and having front and back surfaces that conform to the surface of a cylinder, although it will be understood that other lens structures and shapes can be used.

Figure 17A:
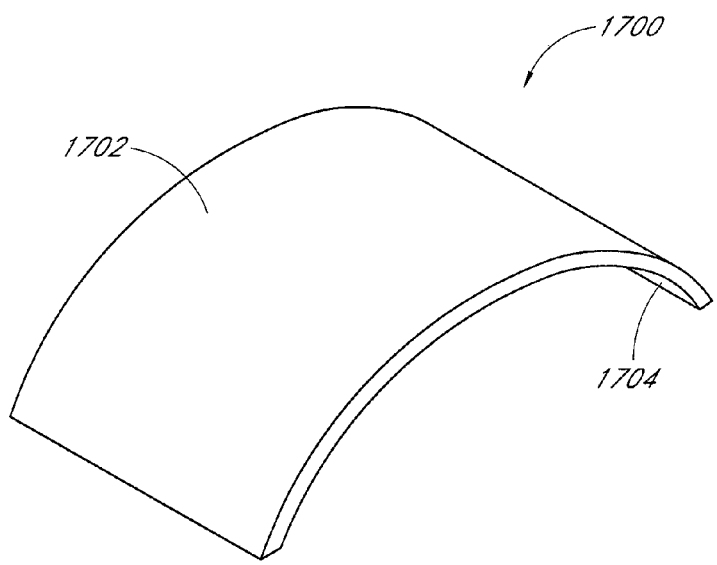
FIG. 17A is a perspective view showing an example of a cylindrical lens blank body.
Figure 17B:
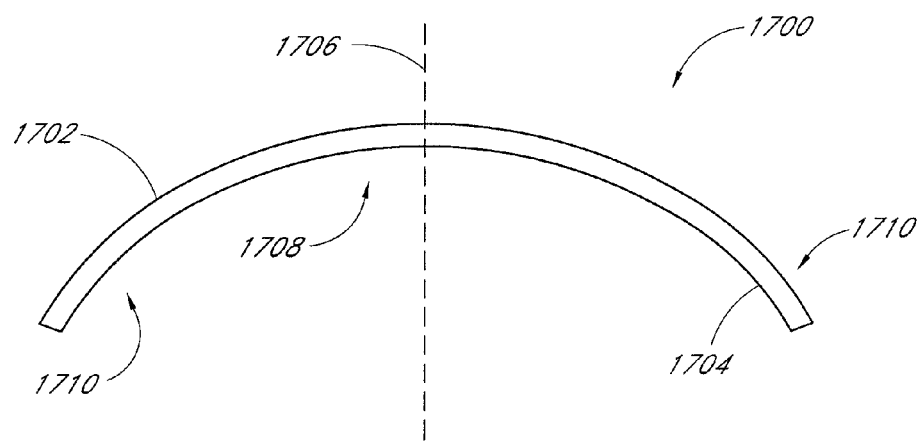
FIG. 17B is a cross-sectional view of the lens blank body of FIG. 17A.

At block 1602, a molded lens blank body is provided. The lens blank body can be formed of polycarbonate, CR-39, glass, or any other suitable material. The lens blank body can be rigid and other layers of the lens can conform to the shape of the lens blank body such that the lens blank body dictates the shape of the final lens. The lens blank body can be injection molded, although other processes can be used to form the shape of the lens blank body, such as thermoforming or machining. FIG. 17A is a perspective view of an example of a cylindrical lens blank body 1700 having a front surface 1702 and a back surface 1704. FIG. 17B is a cross-sectional view of the lens blank body 1700. The lens blank body can be symmetrical across a vertical axis of symmetry 1706. In the embodiment shown in FIGS. 17A-B, the front and back surfaces 1702, 1704 can conform to the surfaces of respective cylinders that have a common center point and different radii, similar to FIG. 3. In some embodiments, the lens blank body 1700 can have a front surface 1702 and back surface 1704 that conform to the surfaces of respective cylinders that have center points offset from each other, similar to FIG. 4, such that the thickness of the lens blank body 1700 tapers from a thicker central portion 1708 to thinner end portions 1710. In some embodiments, the lens blank body 1700 can have a central portion 1708 having a maximum thickness of at least about 0.045 inches and/or less than or equal to about 0.065 inches, or of about 0.055 inches, although thicknesses outside these ranges may also be used. The surfaces of the lens blank body 1700 can conform to other shapes, as discussed herein, such as a sphere or toroid.

At block 1604, a hardcoat is applied to the lens blank body. The lens blank body can be dipped in a polysiloxane material which can then be cured thermally. The thermally cured hardcoat can be harder and more resistant to scratching or smudging than UV curable hardcoats that are typically used on 3D lenses. The hardcoat can be thermally cured at a temperature of at least about 150° F., and/or less than or equal to about 260° F., for a period of time on the order of 2½ hours for high temperature to about 8 hours for low temperature curing although values outside these ranges may also be used in some embodiments. The hardcoat can be thermally cured before the circular polarizer is applied so that the circular polarizer is not exposed to the heat used for curing the hardcoat.

Figure 18A:
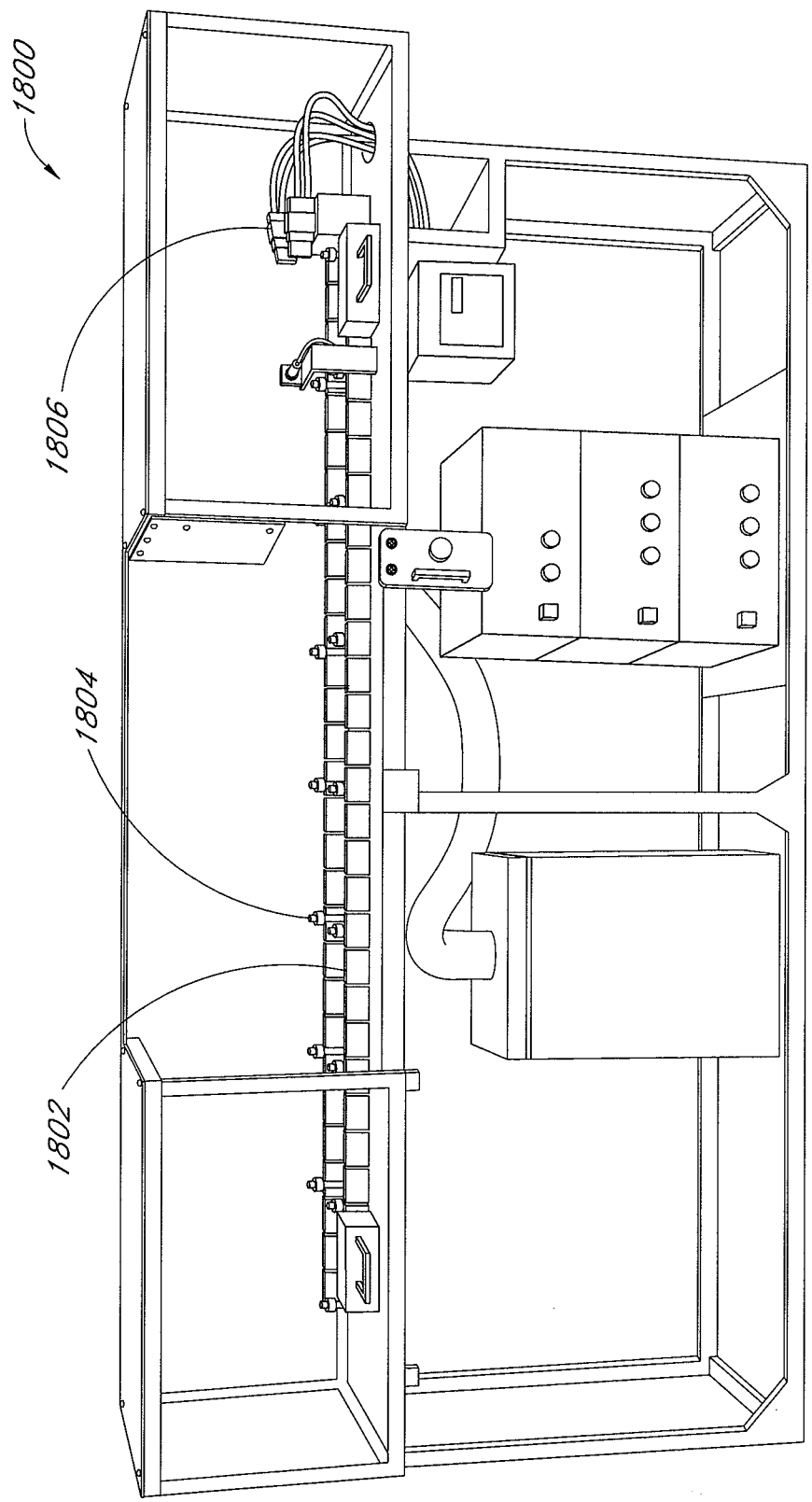
FIG. 18A illustrates an example of a corona treatment system.
Figure 18B:
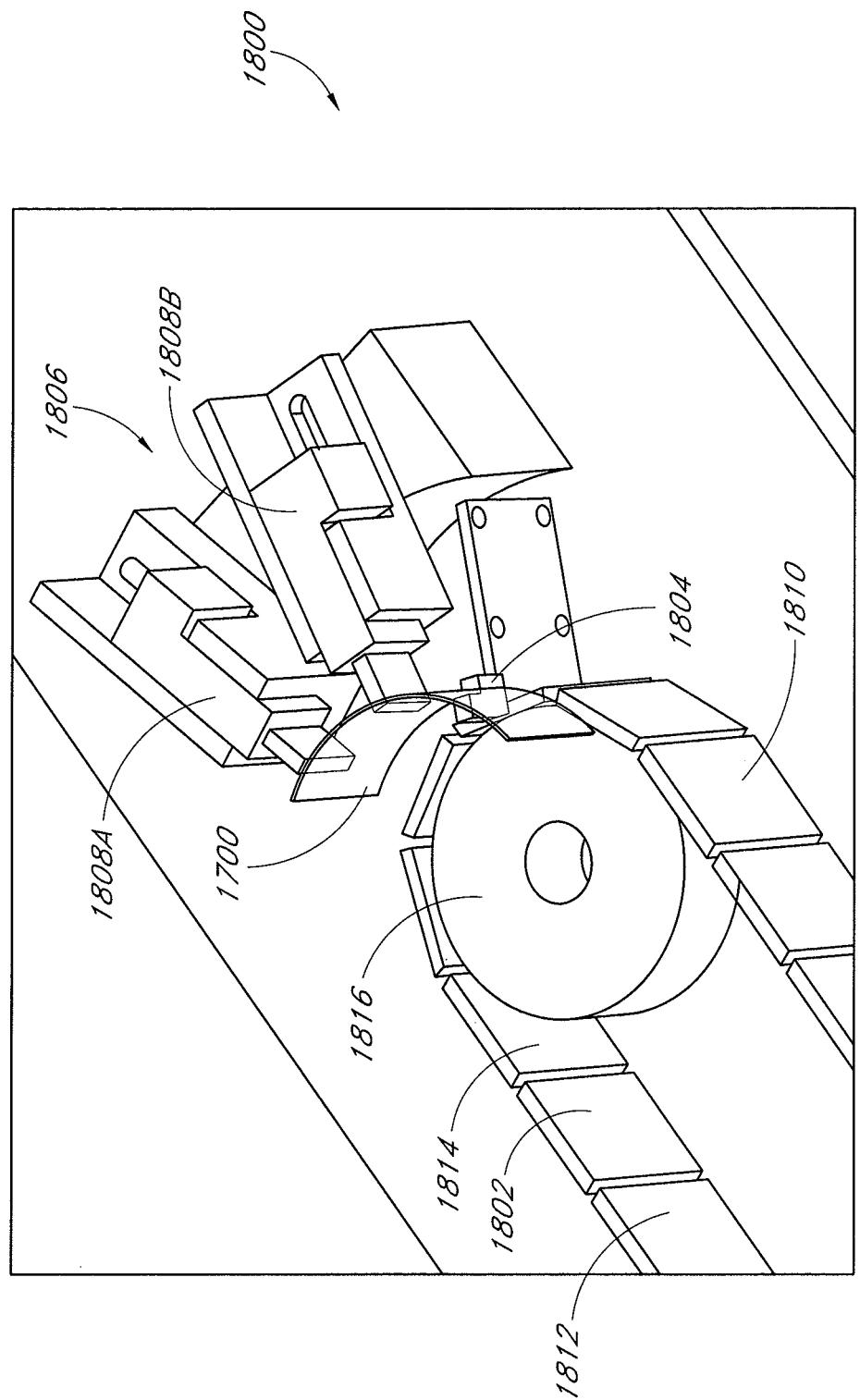
FIG. 18B is a close-up partial view of a portion of the corona treatment system of FIG. 18A.
Figure 18C:
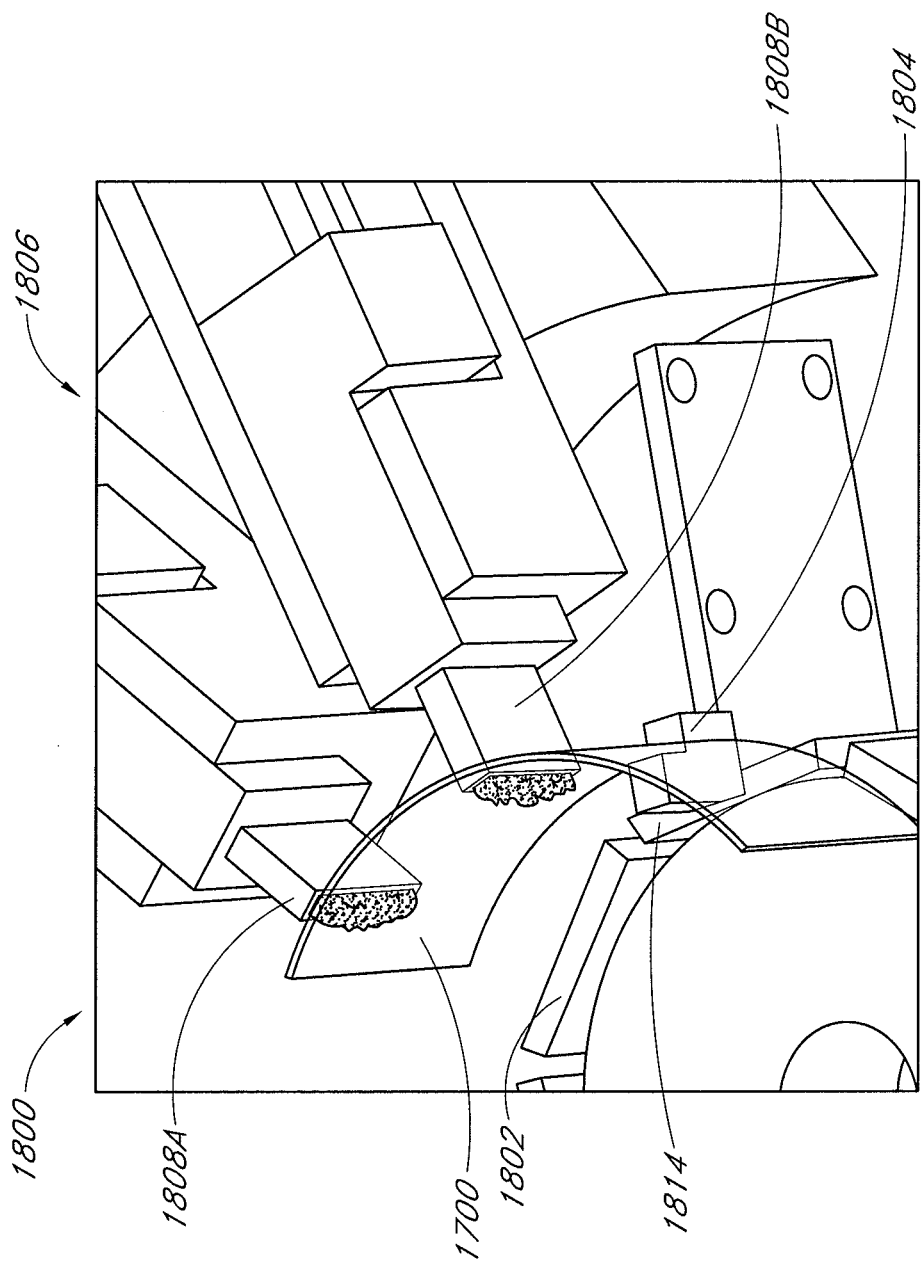
FIG. 18C is another close-up partial view of a portion of the corona treatment system of FIG. 18A.

At block 1606, corona treatment can be applied to the hardcoat on the front surface 1702 of the lens blank body 1700. FIGS. 18A-C illustrate an example embodiment of a corona treatment system 1800 that includes a conveyor belt 1802 configured to transport a series of clips 1804 between a first side 1810 and a second side 1812 of the conveyor belt 1802. The conveyor belt 1802 can include a plurality of link members 1814 that are pivotally connected to each other so that they can turn around turning members 1816 at the ends of the conveyor belt 1802. Some of the link members 1814 can have clips 1804 so that the pre-treatment lens blank bodies 1700 can be attached on the first side 1810 of the conveyor belt 1802, and the post-treatment lens blank bodies 1700 can be removed from the second side 1812 of the conveyor belt 1802, although the direction of the conveyor belt 1802 may be reversed such that pre-treatment lens blank bodies are added on the second side 1812. A motor can drive the conveyor belt 1802 so that the lens blank bodies 1700 pass through the corona treatment 1806 center of the system 1800. The corona treatment center 1806 can include a first corona head 1808A positioned to apply corona treatment to a top portion of the lens blank body 1700 and a second corona head 1808B positioned to apply corona treatment to a bottom portion of the lens blank body 1700. In some embodiments, a single corona head can be used to apply corona treatment to the substantially the entire front surface of the lens blank body 1700.

Many variations are possible. In some embodiments, a handheld corona treatment head can be used to apply corona treatment to the lens blank bodies 1700 by hand. The corona treatment can lower the surface tension to improve the bonding properties of the front surface of the lens blank body 1700 (e.g., of the hardcoat applied thereto). Other surface treatments can also be used, such as ultraviolet (UV) light treatment, ozone treatment, and sodium hydroxide (NaOH) treatment to improve the bonding properties between the lens blank body and the circular polarizer.

Figure 19:
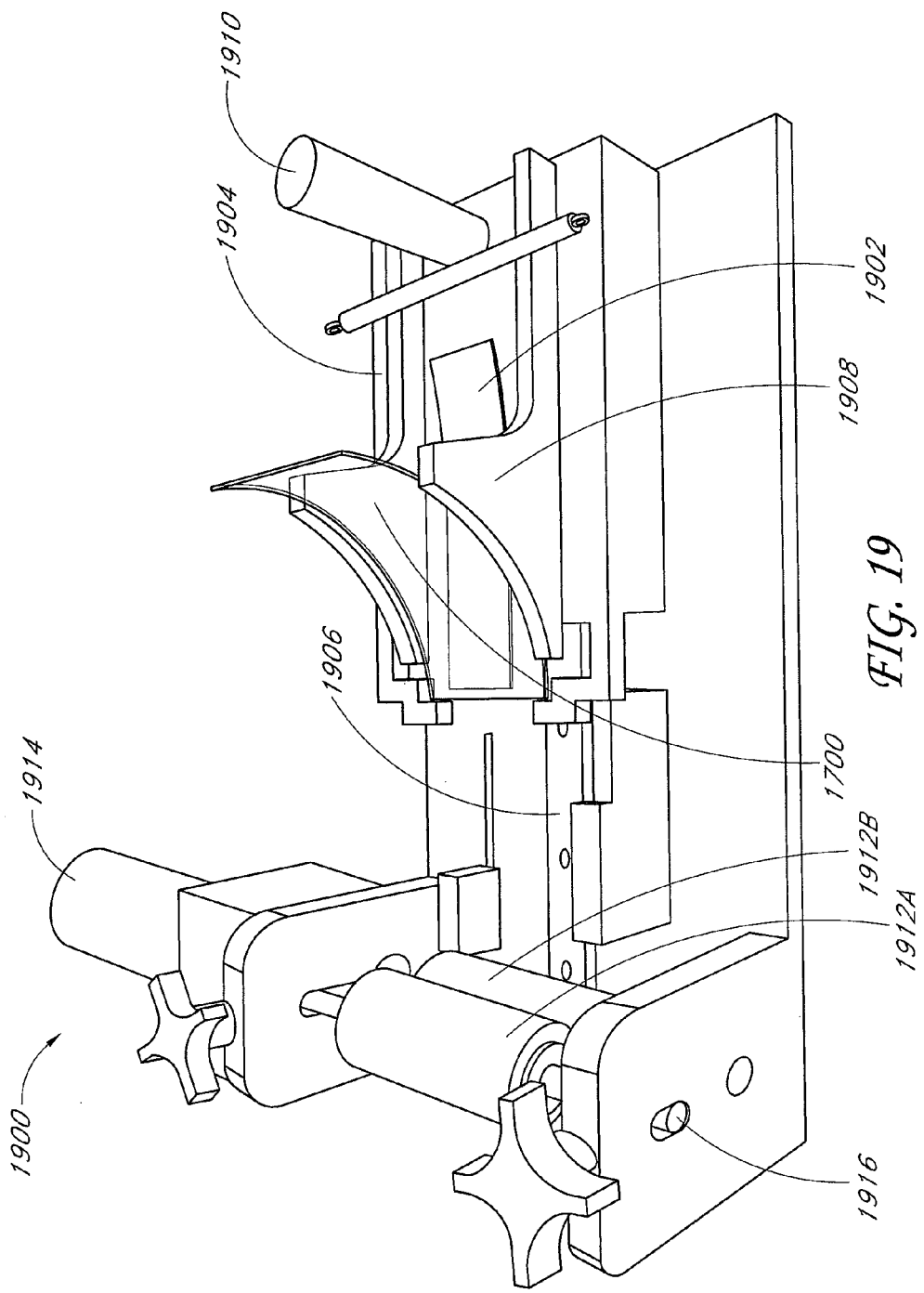
FIG. 19 illustrates an example of a lamination system.

At block 1608 the circular polarizer is laminated to the lens blank body. FIG. 19 illustrates an example of a lamination system 1900 for laminating a film (e.g., a circular polarizer 1902 to the lens blank body 1700 (e.g., to a hardcoat deposited thereon). The lamination system 1900 can include a sliding member 1904 that can slide on a track 1906. The sliding member 1904 can have a lens blank body holder 1908 that can receive the lens blank body 1700 and can receive the circular polarizer film 1902 such that they are aligned with the transmission axis of the linear polarizer layer of the circular polarizer film 1902 is aligned substantially parallel with the linear (non-curved) axis of the lens blank body 1700, such that the angle of aligned varies by less than about 5°, or less than about 3°, or less than about 1°. If the circular polarizer 1902 is not properly aligned with the lens blank body 1700 so that the curvature of the lens blank body 1700 is applied to the transmission axis of the linear polarizer layer of the circular polarizer 1902, the efficiency of the linear polarizer can be reduced, which can result in distortion such as color shift and ineffective image filtering that leads to crosstalk between right- and left-eye images during 3D viewing.

An adhesive can be applied to the lens blank body 1700 or to the circular polarizer film 1902. The adhesive can be substantially optically clear. A pressure sensitive adhesive can be used, and can be rolled, sprayed, or otherwise applied to a surface so that it is disposed between the lens blank body 1700 and the circular polarizer film 1902 after lamination. Other types of adhesives can be used. For example, a UV curing adhesive, or solvent bonding may be used.

The sliding member 1904 can include a handle 1910 that the user can use to push the sliding member 1904 along the track 1906 causing the lens blank body 1700 to contact the rollers 1912A, 1912B. One or more motors 1914 can rotate the top roller 1912A and/or the bottom roller 1912B to feed the lens blank body 1700 and circular polarizer film 1902 between the rollers 1912A, 1912B. The rollers 1912A, 1912B can be configured to apply substantially evenly distributed pressure across the concave surface of the blank and convex surface of the film 1902 for substantially uniform adhesion between the lens blank body 1700 and the circular polarizer film 1902.

In some embodiments, the positions of the rollers 1912A, 1912B can be fixed and the gap between the rollers 1912A, 1912B can be smaller than the thickness of the lens blank body 1700, adhesive layer, and circular polarizer film 1902, such that pressure is applied to the layers as they are fed through the gap between the rollers 1912A, 1912B. In some embodiments, the rollers 1912A, 1912B can include a compressible material that compresses when the lens is fed through the gap. In some embodiments, the position of one or both of the rollers 1912A, 1912B is variable, and at least one spring or other biasing member can bias the rollers 1912A, 1912B towards each other. In the illustrated embodiment of FIG. 19, the axis bar 1916 of the top roller 1912A can move away from the lower roller 1912B during lamination, and a spring can bias the top roller 1912A toward the lower roller 1912B so that a substantially uniform pressure is applied to the lens during lamination.

Although the laminator system 1900 shown in FIG. 19 has a linear gap between the rollers 1912A, 1912B such that it can be used to laminate a cylindrical lens as shown, other configurations are possible. For example, the rollers 1912A, 1912B can be curved so as to accommodate a toroidal or spherical lens to be fed therethrough.

At block 1610, the lens blank can be placed into a pressure pot, and pressure can be applied to squeeze any remaining air out of the laminated lens blank and to apply a uniform pressure to the lens blank and film, thereby improving adhesion. The pressure pot can apply an elevated pressure of at least about 25 psi, preferably at least about 50 psi for at least 30 minutes and in one process about 75 psi for about 60 minutes although other values can also be used.

At block 1612, one or more lenses may be cut from the laminated lens blank. A 3-axis CNC mill cutting machine can be used to cut the lenses from the lens blank. In some embodiments, the edges of the lens can be beveled, facilitating installation of the lenses into the eyewear and improving retention in the eyewear. Square-edged cuts can also be used. Because the right and left lenses can use different circular polarizers, the right and left lenses can be cut from different lens blanks. In some cases, multiple left lenses can be cut from a left lens blank and multiple right lenses can be cut from a right lens blank.

Figure 20:
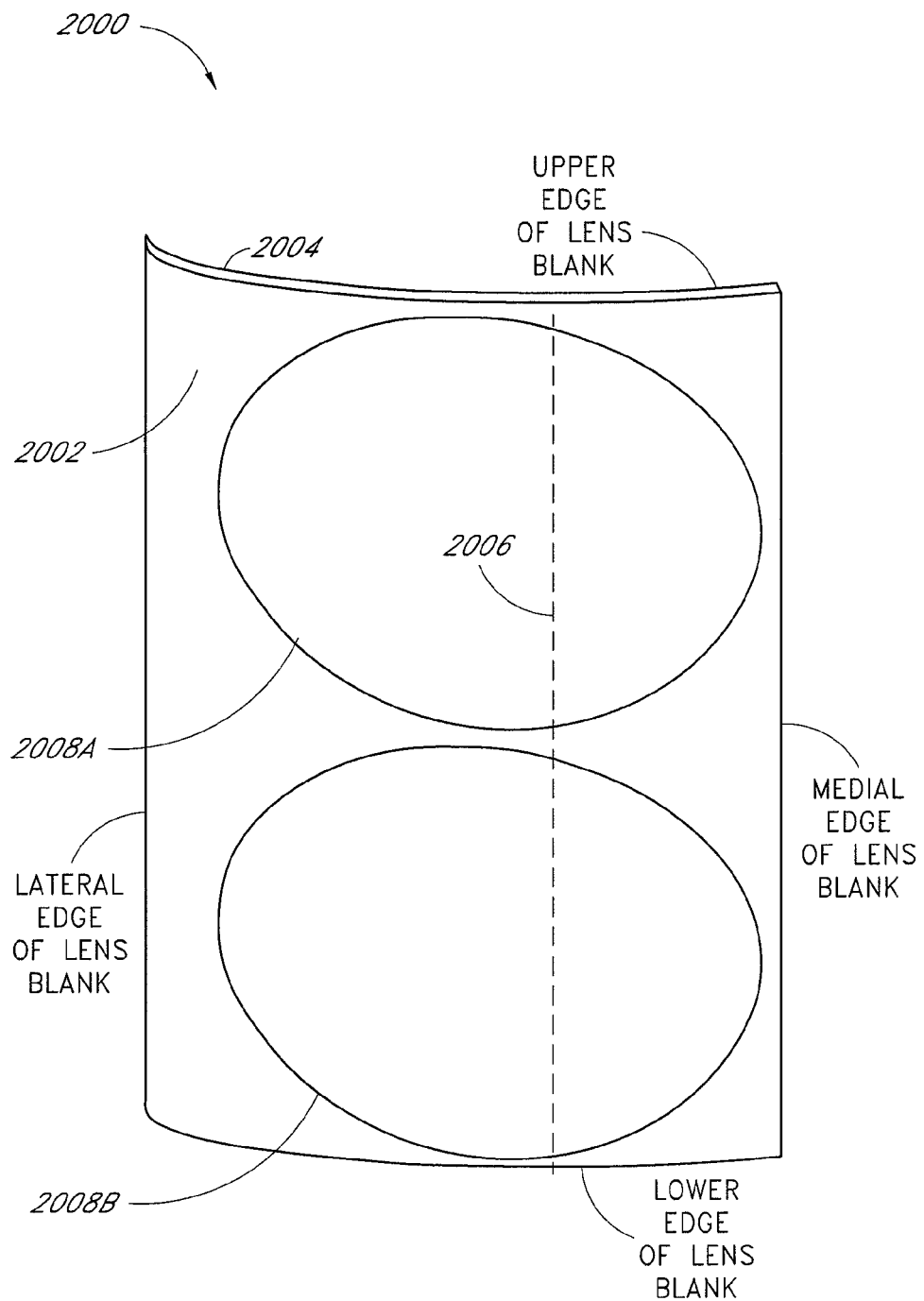
FIG. 20 illustrates an example lens blank having cylindrical surfaces and indicates the locations for lenses to be cut from the lens blank.

FIG. 20 illustrates a lens blank 2000 having front and back surfaces 2002, 2004 that conform to the surfaces of cylinders, and can be similar to or the same as the other lens blanks disclosed herein in many regards. The mechanical center line, apex, or thickest portion of the lens blank 2000 is shown by the line 2006. In the embodiment shown in FIG. 20 the lens blank 2000 is not symmetrical across the axis 2006. Multiple right lenses 2008A, 2008B can be cut from the lens blank 2000. The second right lens 2008B can have the same shape as the first right lens 2008A, and can be cut from the same position along the horizontal axis as the first right lens 2008A, such that the second right lens 2008B is cut from a location disposed directly below the first right lens 2008B. Corresponding points on the first right lens 2008A and second right lens 2008B are spaced the same horizontal distance from the vertical axis 2006. Although the illustrated lens blank 2000 shows two lenses to be cut from the lens blank 2000, additional lenses may be cut from the same lens blank depending on the size of the lens blank. In some embodiments, right lenses of different shapes can be cut from a single lens blank 2000. Left lenses can similarly be cut from a left lens blank that can be shaped the same as right lens blank 2000, but have a differently oriented circular polarizer.

Figure 21:
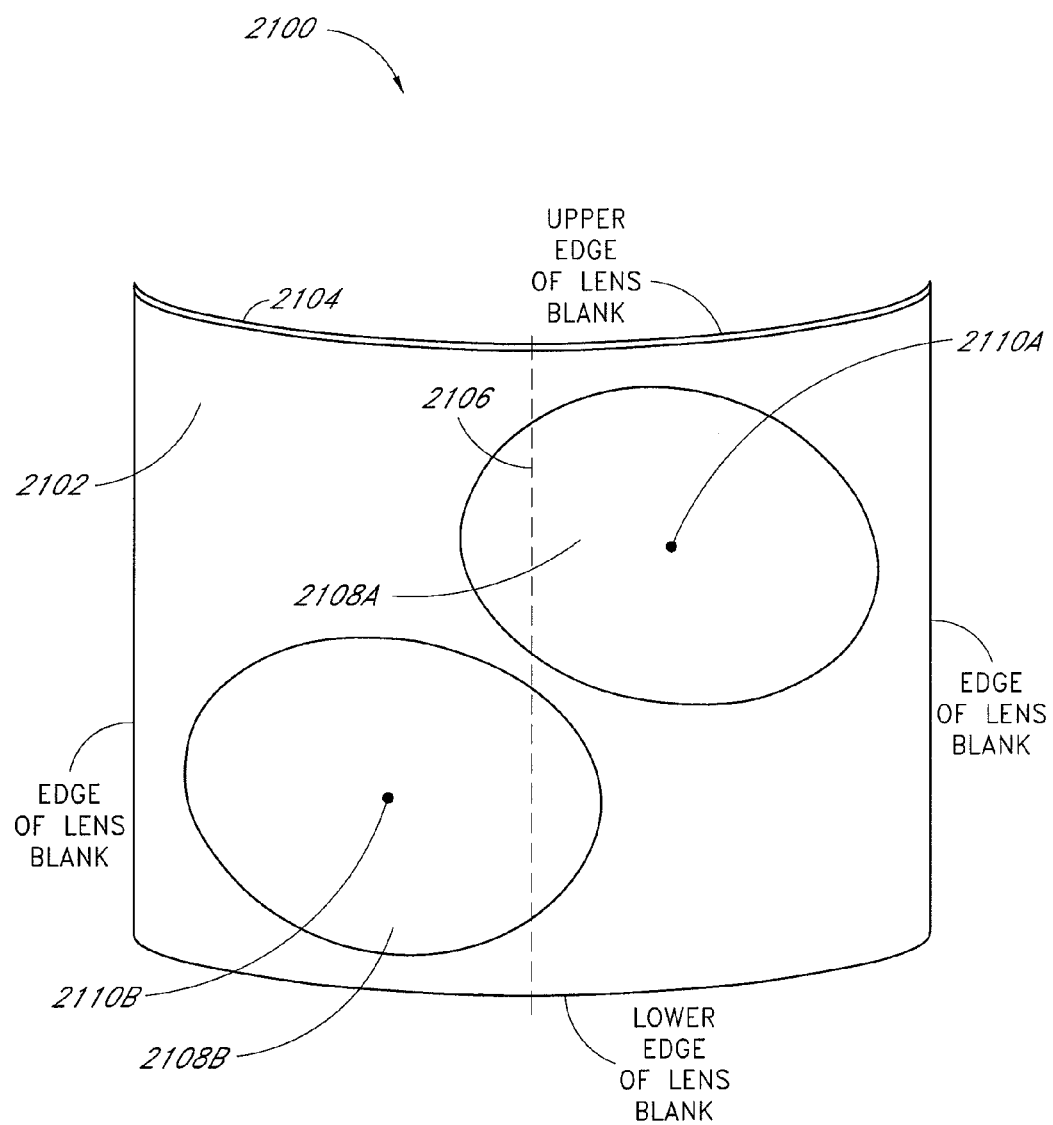
FIG. 21 illustrates another example of a lens blank having cylindrical surfaces and indicates the location for lenses to be cut from the lens blank.

FIG. 21 illustrates a lens blank 2100 having front and back surfaces 2102, 2104 that conform to the surfaces of cylinders, and can be similar to or the same as the other lens blanks disclosed herein in many regards. The mechanical center line, apex, or thickest portion of the lens blank 2100 is shown by the line 2106. In the embodiment shown in FIG. 21 the lens blank 2100 is symmetrical across the axis 2106. Multiple right lenses 2108A, 2108B can be cut from the lens blank 2100. The second right lens 2108B can have the same shape as the first right lens 2108A, and the second right lens 2108B can be upside-down relative to the first right lens 2108A. Corresponding points on the first right lens 2108A and second right lens 2108B are spaced the same horizontal distance from the vertical axis 2106 but in opposite directions. In some embodiments, more than half of the first right lens 2108A lies on a first side of the vertical axis 2106, and more than half of the second right lens 2108B lies on a second side of the vertical axis 2106. A mechanical centerpoint 2010A of the first lens 2008A can be positioned on the right side of the axis 2106, and a mechanical centerpoint 2010B of the second lens 2008B can be positioned on the left side of the axis 2106, and the two centerpoints 2010A, 2010B can be positioned substantially equidistant from the axis 2106 in the horizontal direction. Because the right lens blank 2100 is symmetrical across the vertical axis 2106, the second right lens 2108B can be substantially the same as the first right lens 2108A in shape, curvature, and thickness (e.g., tapering), except that the second right lens 2108B is rotated about 180° relative to the first right lens 2108A. Although the illustrated lens blank 2100 shows two lenses to be cut from the lens blank 2100, additional lenses may be cut from the same lens blank depending on the size of the lens blank. In some embodiments, right lenses of different shapes can be cut from a single lens blank 2100. Left lenses can similarly be cut from a left lens blank that can be shaped the same as right lens blank 200, but have a differently oriented circular polarizer.

In block 1614 the 3D lenses are mounted into a frame to produce 3D eyewear. Lenses in accordance with some embodiments demonstrate prismatic distortion at least as low as ¼ diopters, or ³⁄₁₆ diopters, and often less than about ⅛ diopters. In some embodiments the prismatic distortion is less than about ¹⁄₁₆ diopters or less than about ¹⁄₃₂ diopters. Refractive power and astigmatism for lenses in accordance with the some embodiments are also low. Each of refractive power and astigmatism are also at least as low as ¼ diopters or ³⁄₁₆ diopters and can be less than about ⅛ diopters, ¹⁄₁₆ diopters, or ¹⁄₃₂ diopters. In some embodiments, 3D lenses disclosed herein can hold at least about 20 lines of definition pattern resolution.

The 3D lenses disclosed herein can have high polarization efficiency. In some embodiments, the high polarization efficiency can be attributed to one or more of the following features of the 3D lenses disclosed herein. The curved 3D lenses can be assembled without exposing the circular polarizer to heat, thereby maintaining the integrity of the linear polarizer and quarter-wave plate that make up the circular polarizer. In some conventional curved polarizing lenses, heat is applied to the lens and may reduce the polarization efficiency of the circular polarizer. Also, in some embodiments disclosed herein, the lenses are curved in only one direction (e.g., along the horizontal axis) and are linear in the other direction (e.g., along the vertical axis), and the circular polarizer can be aligned such that the transmission axis of the linear polarizer substantially aligns with the linear, non-curved, direction. Also, by placing the circular polarizer at the forward end of the lens, the circular polarizer can receive the light before the other layers of the lens introduce aberrations or otherwise alter the light in ways that would lower the polarization efficiency of the lens. In some embodiments, a lens can have a polarization efficiency of at least about 98%, preferably at least about 99.0%, or at least about 99.5% and in one embodiment at least about 99.7%. The polarization efficiency can also be constant for off-axis viewing across a wide range of angles in both the horizontal and vertical directions. Thus, the wearer can view 3D images at angles offset from the wearer's normal line of sight without experiencing significant loss of polarization efficiency and crosstalk between right- and left-eye images, and the curvature of the lenses can provide greater coverage of the wearer's peripheral vision than traditional planar lenses, as well as superior aesthetic style. The lens may have a contrast ratio (dark state to light state) in the range of from about 200 to about 700, and a retardation value of about 125 nm±10 nm. In certain embodiments, the % T is in the range of from about 38% to about 47%, the spectro ratio of single pass (just the lens) to L/R circular polarizers opposing each other is about 400 to 1000 or greater and the angular value of the linear polarizer to quarter wave plate is about −45°±2° for left and about 135°±2° for the right.

The present disclosure describes various features relating to lenses for 3D eyewear, no single one of which is solely responsible for the benefits described herein. It will be understood that various features described herein may be combined, modified, or omitted as would be apparent to on of ordinary skill. Other combinations and sub-combinations than those specifically described herein are intended for form a part of this disclosure. Various methods are described herein in connection with various flowchart steps. In many cases, certain steps may be combined together such that multiple steps shown in separate flowchart steps can be performed together as a single step. Similarly, certain steps may be broken in to sub-steps to be performed separately. In some cases, the order to the steps can be rearranged and certain steps can be omitted entirely. Also, the methods described herein are to be understood to include methods that include additional steps to those specifically described herein.

Although the present invention has been described in terms of certain embodiments, other embodiments will become apparent to those of ordinary skill in the art in view of the disclosure herein. Accordingly, the scope of the present invention is not intended to be limited by the recitation of these embodiments, but is intended to be defined solely by reference to the appended claims.

What is claimed is:

1. A lens for use with 3D eyewear, the lens comprising:
a lens body having a cylindrical surface that is curved along a first axis and substantially linear along a second axis; and
a circular polarizer attached to the surface of the lens body.

2. The lens of claim 1, wherein the second axis is offset from the first axis by about 90°.

3. The lens of claim 1, wherein the circular polarizer comprises a quarter-wave plate and a linear polarizer.

4. The lens of claim 3, wherein the linear polarizer comprises a transmission axis, and wherein the transmission axis is aligned substantially parallel to the second axis of the lens body.

5. The lens of claim 1, further comprising a hardcoat disposed between the lens body and the circular polarizing film.

6. The lens of claim 5, wherein the hardcoat comprises thermally cured polysiloxane.

7. The lens of claim 5, wherein the circular polarizer is laminated onto the hardcoat with an adhesive disposed between the hardcoat and the circular polarizer.

8. The lens of claim 7, wherein the hardcoat is treated with corona discharge to lower the surface tension of the hardcoat before lamination.

9. The lens of claim 1, wherein the lens body does not comprise UV blocking additives.

10. The lens of claim 1, wherein the lens body is an injection molded lens body.

11. The lens of claim 1, wherein the lens body has a front surface and a back surface, and wherein the circular polarizer is attached to the front surface of the lens body.

12. The lens of claim 11, wherein the circular polarizer is the most forward layer of the lens, such that, during 3D viewing, light of an image strikes the circular polarizer before any other layer of the lens.

13. The lens of claim 1, wherein the lens body comprises a front surface and a back surface, wherein the front surface conforms to the surface of a front cylinder having a first center, wherein the back surface conforms to the surface of a back cylinder having a second center, and wherein the second center is offset from the first center such that the thickness of the lens body is tapered along the first axis.

14. The lens of claim 1, further comprising an eyewear frame supporting the lens, wherein a line drawn between the first center and the second center provides an optical centerline for the lens, and wherein the lens is positioned in the eyewear frame such that the line of sight of the wearer is substantially parallel to the optical centerline, and such that the line of sight of the wearer is offset from the optical centerline.

15. The lens of claim 1, wherein the curvature along the first axis has a substantially uniform radius of curvature.

16. The lens of claim 1, wherein the curvature along the first axis has a substantially non-uniform radius of curvature.

* * * * *